United States Patent
Sakurada et al.

(10) Patent No.: US 11,250,353 B2
(45) Date of Patent: Feb. 15, 2022

(54) CARSHARING SYSTEM AND CARSHARING METHOD

(71) Applicant: TOYOTA JIDOSHA KABUSHIKI KAISHA, Toyota (JP)

(72) Inventors: Shin Sakurada, Toyota (JP); Koichi Ando, Nagoya (JP); Mutsumi Matsuura, Okazaki (JP); Masato Endo, Nagakute (JP); Koki Fujita, Suginami-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 501 days.

(21) Appl. No.: 16/196,138

(22) Filed: Nov. 20, 2018

(65) Prior Publication Data
US 2019/0205797 A1   Jul. 4, 2019

(30) Foreign Application Priority Data
Dec. 28, 2017   (JP) .............................. JP2017-255029

(51) Int. Cl.
*G06Q 10/02*   (2012.01)
*G06Q 50/28*   (2012.01)
(Continued)

(52) U.S. Cl.
CPC .............. *G06Q 10/02* (2013.01); *B60R 25/24* (2013.01); *G06Q 10/083* (2013.01);
(Continued)

(58) Field of Classification Search
CPC .. G06Q 10/02; G06Q 10/083; G06Q 30/0601; G06Q 30/0645; G06Q 50/28;
(Continued)

(56) References Cited

U.S. PATENT DOCUMENTS 6,850,153 B1   2/2005   Murakami et al.
9,508,204 B2   11/2016  Oz et al.
(Continued)

FOREIGN PATENT DOCUMENTS

CN   1036174 A      10/1989
CN   103971313 A    8/2014
(Continued)

OTHER PUBLICATIONS

"User decision-making and technology choices in the U.S. car sharing market" Published by Massachusetts Institute of Technology (Year: 2016).*
(Continued)

*Primary Examiner* — Jeff Zimmerman
(74) *Attorney, Agent, or Firm* — Oblon, McClelland, Maier & Neustadt, L.L.P.

(57) ABSTRACT

A carsharing system includes circuitry configured to: receive, from a user, a usage request for requesting a reservation for use of a vehicle which is supplied for a vehicle rental service; permit the reservation for use of the vehicle when the reception unit receives the usage request and no reservation for use of the vehicle has been made at time of receiving the usage request; and give, when the reservation for use of the vehicle is determined, a permission for locking or unlocking by using electronic information to the user at a date and a time on which the vehicle is used.

16 Claims, 21 Drawing Sheets

(51) Int. Cl.
*G07F 17/12* (2006.01)
*G06Q 10/08* (2012.01)
*G07C 9/00* (2020.01)
*G06Q 30/06* (2012.01)
*G07B 15/02* (2011.01)
*G07C 9/21* (2020.01)
*B60R 25/24* (2013.01)

(52) U.S. Cl.
CPC ..... *G06Q 30/0601* (2013.01); *G06Q 30/0645* (2013.01); *G06Q 50/28* (2013.01); *G07B 15/02* (2013.01); *G07C 9/00571* (2013.01); *G07C 9/21* (2020.01); *G07F 17/12* (2013.01); *G07C 2009/0092* (2013.01)

(58) Field of Classification Search
CPC .................. G07C 9/27; G07C 9/00571; G07C 2009/0092; B60R 25/24; G07B 15/02; G07F 17/12
USPC ........................................................... 705/5
See application file for complete search history.

(56) References Cited

U.S. PATENT DOCUMENTS

| | | | |
|---|---|---|---|
| 10,668,896 | B2 | 6/2020 | Arakawa et al. |
| 2010/0114616 | A1 | 5/2010 | Touati |
| 2012/0290380 | A1* | 11/2012 | Paul ....................... G06Q 10/02 705/14.33 |
| 2013/0325521 | A1 | 12/2013 | Jameel et al. |
| 2014/0129301 | A1 | 5/2014 | Van Wiemeersch et al. |
| 2014/0278608 | A1* | 9/2014 | Johnson .................. G01S 19/51 705/5 |
| 2015/0185034 | A1 | 7/2015 | Abhyanker |
| 2015/0332531 | A1 | 11/2015 | Davidsson et al. |
| 2016/0096508 | A1 | 4/2016 | Oz et al. |
| 2016/0189098 | A1* | 6/2016 | Beaurepaire ........ H04W 12/084 705/337 |
| 2016/0321566 | A1* | 11/2016 | Liu .................... G01C 21/3438 |
| 2017/0017920 | A1 | 1/2017 | Stark et al. |
| 2017/0018181 | A1 | 1/2017 | Davidsson et al. |
| 2017/0206475 | A1* | 7/2017 | Shoen ................ G06Q 30/0645 |
| 2017/0316621 | A1* | 11/2017 | Jefferies ................ G06Q 50/30 |
| 2020/0156591 | A1* | 5/2020 | Arakawa .................. G07C 9/28 |
| 2020/0309551 | A1* | 10/2020 | Yang ...................... G08G 1/205 |

FOREIGN PATENT DOCUMENTS

| | | |
|---|---|---|
| CN | 105760940 A | 7/2016 |
| CN | 107103521 A | 8/2017 |
| EP | 2 911 101 A1 | 8/2015 |
| EP | 3 253 031 A1 | 12/2017 |
| IN | 2783/MUM/2015 A | 1/2017 |
| JP | 2005-134962 A | 5/2005 |
| JP | 2006-206225 | 8/2006 |
| JP | 2008-117076 A | 5/2008 |
| JP | 2010-522392 A | 7/2010 |
| JP | 2015-45141 | 3/2015 |
| JP | 2016-146030 A | 8/2016 |
| KR | 10-2017-0141911 A | 12/2017 |
| WO | WO 2016/054200 A1 | 4/2016 |

OTHER PUBLICATIONS

Office Action dated Jul. 28, 2021 in U.S. Appl. No. 16/851,619.

* cited by examiner

FIG. 4

| VEHICLE ID | REGISTRATION NUMBER | OWNER ID | PARKING LOT ADDRESS | PARKING LOT POSITION (LATITUDE, LONGITUDE) | VEHICLE MANUFACTURER | POPULAR NAME | COLOR | YEAR OF REGISTRATION | MOVEMENT LIMITING CONDITIONS | ONBOARD COMMUNICATION DEVICE ADDRESS |
|---|---|---|---|---|---|---|---|---|---|---|
| VE1 | AAA BBB C DD-DD | ON1 | N, T1-cho, C2-shi | (LATITUDE LA1, LONGITUDE LO1) | AAA | GX | WH | 20NN | FIXED TO PARKING LOT ON WEEKDAYS | Addr |
| .. | .. | .. | .. | .. | .. | .. | .. | .. | .. | .. |

FIG. 5

| CLUSTER ID | CLUSTER ID | CLUSTER POSITION RANGE (X1, Y1, X2, Y2) |
|---|---|---|
| CL1 | C2-shi, P1-ken | (LATITUDE LA1, LONGITUDE LO1, LATITUDE LA2, LONGITUDE LO2) |
| .. | .. | .. |

FIG. 6

| CLUSTER ID | NUMBER OF REGISTERED VEHICLES | VEHICLE ID1 | VEHICLE ID2 | ... | |
|---|---|---|---|---|---|
| CL1 | N1 | VE1 | VE2 | ... | |
| .. | .. | .. | .. | .. | .. |

FIG.7

| OWNER ID | NAME | ADDRESS | PASSWORD |
|---|---|---|---|
| ON1 | FN1 LN1 | B1, T1-cho, C2-shi | PW1 |
| . . | . . | . . | . . |

FIG. 8

| OWNER ID | PROVISION OF MOVEMENT SCHEDULE | AGREEMENT TO MOVEMENT LIMITING | MONTHLY FREQUENCY OF VEHICLE INTERIOR RENTAL CHANGE DUE TO CHANGE OF SCHEDULE | MONTHLY FREQUENCY OF VEHICLE INTERIOR RENTAL IMPLEMENTATION | MONTHLY SUM OF INCENTIVE POINTS |
|---|---|---|---|---|---|
| ON1 | YES | YES | NCS1 | NOK1 | PP1 |
| .. | .. | .. | .. | .. | .. |

FIG. 9

| USER ID | NAME | ADDRESS | PASSWORD |
|---|---|---|---|
| USR1 | FN1 LN1 | B2, T1-cho, C2-shi | PW2 |
| . . | . . | . . | . . |

FIG. 10

VEHICLE ID: ID1

| DATE | TIME | VEHICLE MOVEMENT SCHEDULE |
|---|---|---|
| YYYYMMD1 | FROM 0:00 TO 8:00 | NO |
| YYYYMMD1 | FROM 8:00 TO 14:00 | YES |
| .. | .. | .. |
| .. | .. | .. |

FIG. 11

VEHICLE ID: ID1

| DATE | TIME | RENTAL |
|---|---|---|
| .. | .. | .. |
| YYYYMMD1 | FROM 0:00 TO 11:00 | NO |
| YYYYMMD1 | FROM 11:00 TO 15:00 | YES |
| .. | .. | .. |
| YYYYMMD1 | FROM 23:00 TO 24:00 | NO |
| YYYYMMD2 | FROM 0:00 TO 1:00 | NO |
| .. | .. | .. |

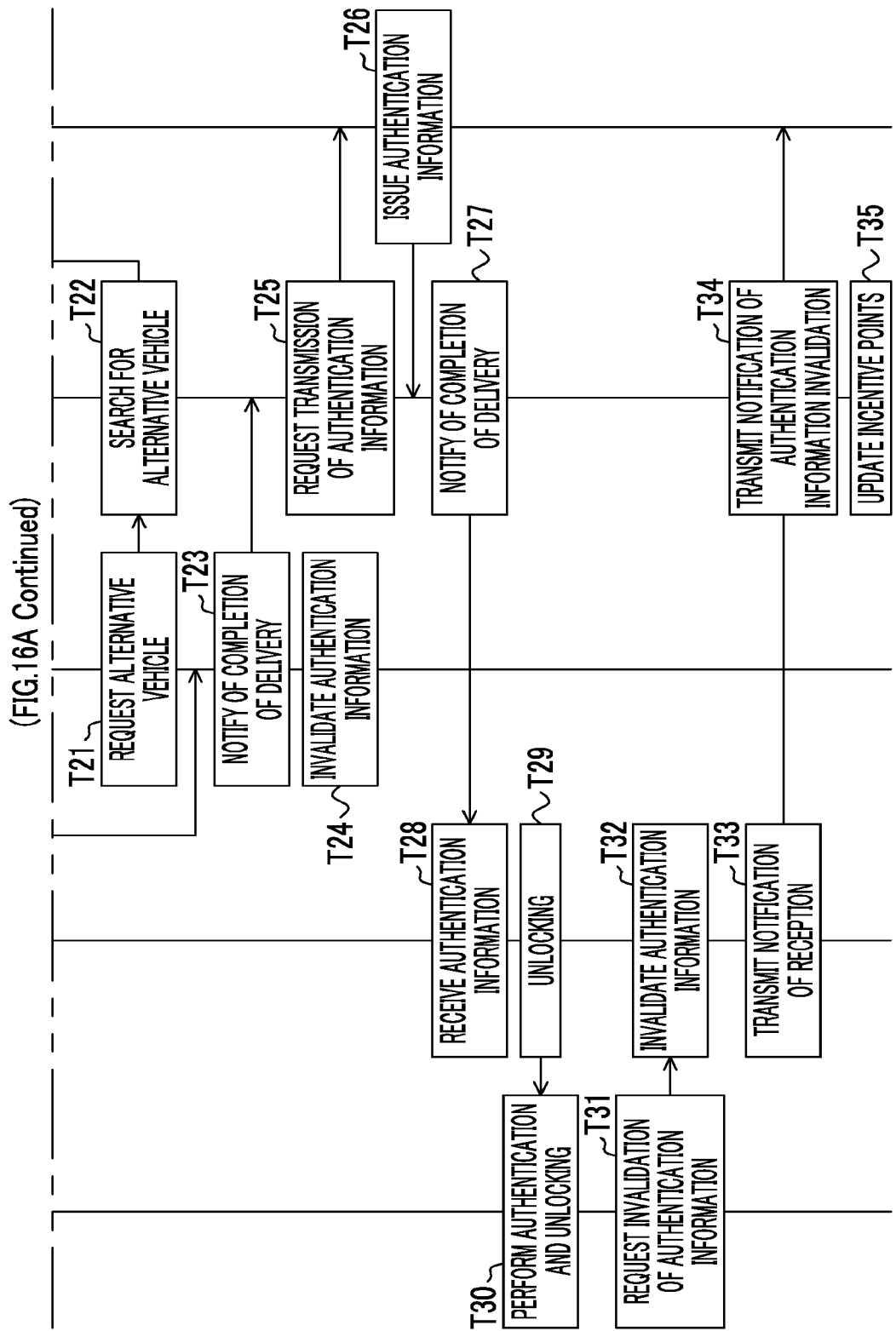

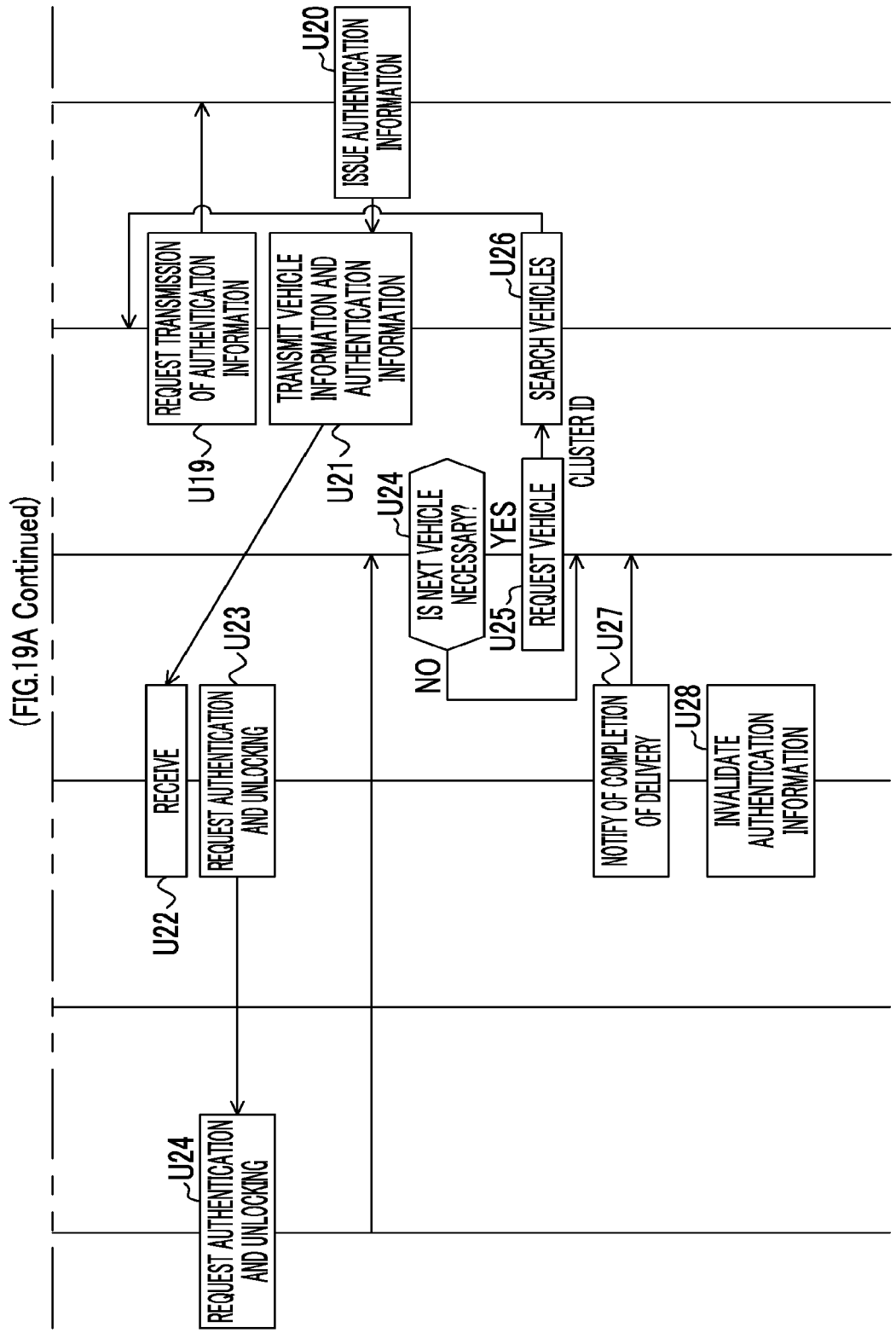

CARSHARING SYSTEM AND CARSHARING METHOD

INCORPORATION BY REFERENCE

The disclosure of Japanese Patent Application No. 2017-255029 filed on Dec. 28, 2017 including the specification, drawings and abstract is incorporated herein by reference in its entirety.

BACKGROUND

1. Technical Field

The disclosure relates to a carsharing system and a carsharing method.

2. Description of Related Art

Recently, a trunk-sharing system in which a trunk (hereinafter referred to as a cargo compartment) of a vehicle which is designated by a user is used as a pickup and delivery place of a delivery object has been developed as means for efficiently performing pickup and delivery of a delivery object between a user of a pickup and delivery service and a pickup and delivery agent. For example, Japanese Unexamined Patent Application Publication No. 2006-206225 (JP 2006-206225 A) discloses that a business communication device mounted in a vehicle of a home delivery company and a baggage-receiving vehicle which is registered and designated as a delivery destination by a receiver perform mutual authentication and a delivery object is accommodated in a trunk of the baggage-receiving vehicle at the time of pickup and delivery of a delivery object. Accordingly, even when the receiver is absent, the baggage-receiving vehicle can alternatively receive baggage.

SUMMARY

In addition to a service in which a cargo compartment and a passenger compartment of a host vehicle (hereinafter a cargo compartment and a passenger compartment are collectively referred to as the interior of a vehicle) are used as a delivery destination of baggage as in the related art, various services in which a host vehicle, the interior of a vehicle of a specific person, or the interiors of a plurality of vehicles owned by a plurality of persons are used by the specific person or shared by a plurality of persons are conceivable. When the interior of a vehicle is used by more persons or shared by a plurality of persons, the vehicle can be used for various applications in addition to reception of baggage.

However, the configuration in the related art is merely a configuration in which it is possible to receive the baggage by a receiver designating, as a delivery destination, a vehicle which has been registered in advance by the receiver. Therefore, the disclosure provides a carsharing system in consideration with movement of a vehicle in a case where the interior of the vehicle is used by more persons or the interior of the vehicle is shared by a plurality of persons.

A carsharing system according to a first aspect of the disclosure includes circuitry configured to: receive, from a user, a usage request for requesting a reservation for use of a vehicle which is supplied for a vehicle rental service; permit the reservation for use of the vehicle when the circuitry receives the usage request and no reservation for use of the vehicle has been made at time of receiving the usage request; and give, when the reservation for use of the vehicle is determined, a permission for locking or unlocking by using electronic information to the user at a date and a time on which the vehicle is used. According to this aspect, a reservation for use of the vehicle rental service is permitted at a scheduled date and time at which a usage request for a vehicle has not been issued, and a scheduled rental user can use the vehicle.

In the aspect, the usage request may include a desired rental schedule which is a schedule in which the user desires rental of the vehicle, and the circuitry may be configured to: store reservation schedule information indicating a status of the reservation for use of the vehicle; acquire movement schedule information indicating a movement schedule of the vehicle; and provide information on vehicle of which both the reservation schedule information and the movement schedule information satisfy the desired rental schedule.

According to this aspect, since the management unit provides information on an available vehicle in consideration of both the reservation schedule information and the movement schedule information of vehicles, it is possible to provide a carsharing system in consideration with movement of a vehicle when a person other than an owner of the vehicle uses the vehicle or the vehicle is shared by a plurality of persons. Here, when the interior of a vehicle is rented, the interior of the vehicle includes at least one of a cargo compartment (also referred to as a trunk) and a passenger compartment. The passenger compartment is a space in which an occupant sits.

In the aspect, the desired rental schedule may include a scheduled transportation date and time, transportation of baggage being planned to be performed at the scheduled transportation date and time, and the circuitry may be configured to: select a selected vehicle which is available at the scheduled transportation date and time; and set a reservation for use of the selected vehicle at the scheduled transportation date and time in the reservation schedule information. The circuitry may be configured to control transmitting, to a terminal of a service user associated with the transportation of the baggage, information for identifying the selected vehicle and access permission information for permitting an access to interior of the selected vehicle.

According to this aspect, since the management unit reserves the interior of a vehicle in consideration of both the reservation schedule information and the movement schedule information of vehicles, it is possible to restrain changes of reservations and to enhance a likelihood that transportation of baggage will be smoothly performed.

In the aspect, the usage request may include receiver terminal information for specifying an address of a terminal of a receiver who receives the baggage, and the circuitry may be configured to control transmitting, to the terminal of the receiver, the information for identifying the selected vehicle and the access permission information for permitting an access to the interior of the selected vehicle.

According to this aspect, the access permission information can be transmitted to the terminal of the receiver who receives the baggage. Furthermore, an access to the interior of the selected vehicle by the receiver who receives the baggage can be permitted.

In the above aspect, the vehicles which are supplied for the vehicle rental service may be grouped based on geographical position relationships correlated with the vehicles respectively, and the circuitry may be configured to: determine one vehicle of the vehicles as an alternative vehicle, the one vehicle belonging to same group as a vehicle which is a transportation destination when a notification is received from the terminal of the service user, the notification indicating that an over-capacity has occurred, the over-capacity being a situation in which baggage to be transported is not able to be accommodated in the interior of the vehicle which is the transportation destination; and control transmitting, to the terminal of the service user, information for identifying the alternative vehicle and access permission information for permitting an access to the interior of the alternative vehicle.

According to this aspect, in the carsharing system, even when an over-capacity in which baggage cannot be accommodated in the interior of the vehicle which is a transportation destination of the baggage has occurred, it is possible to secure an alternative vehicle near the vehicle which is the transportation destination and to enhance a likelihood that the transportation will be smoothly performed.

In the above aspect, the vehicles which are supplied for the vehicle rental service may be grouped based on geographical position relationships correlated with the vehicles, the circuitry may be configured to: receive, from a terminal of an owner of the vehicle, a change request for changing a movement schedule of the vehicle related to a period overlapping with a rental schedule, from a first plan to a second plan, the rental schedule being a schedule in which rental of the vehicle is reserved, the first plan being a plan that the vehicle is not to move, and the second plan being a plan that the vehicle is to move; determine one vehicle of the vehicles as an alternative vehicle, the one vehicle belonging to same group as a vehicle which is a transportation destination; and control transmitting, to the terminal of the service user, information for identifying the alternative vehicle and access permission information for permitting an access to interior of the alternative vehicle.

According to this aspect, in the carsharing system, even when a movement schedule of an owner of a vehicle has changed, the owner of the vehicle can reduce inconvenience of a user who has reserved the vehicle and enhance a likelihood that movement using the vehicle will be able to be performed as much as possible.

In the above aspect, the movement schedule information may be generated based on activity schedule information in which an activity schedule of an owner of the vehicle is set.

According to this aspect, in the carsharing system, it is possible to easily set a movement schedule using an activity schedule of an owner of a vehicle.

In the above aspect, the circuitry may configured to offer a predetermined incentive to an owner of the vehicle who has permitted provision of the movement schedule information or an owner who has agreed to acceptance of movement limitation of a vehicle.

According to this aspect, with the carsharing system, it is possible to enhance a likelihood that an owner of a vehicle will provide a movement schedule of the vehicle and to enhance accuracy of information on an available vehicle. With the carsharing system, it is possible to enhance a likelihood that an owner of a vehicle will accept limitation of movement of the vehicle and to enable smooth operation of the carsharing system.

In the above aspect, the circuitry may be configured to determine incentive points offered to an owner of a reserved vehicle based on a first ratio or a second ratio, the reserved vehicle being a vehicle of which rental is reserved based on the reservation schedule information, the first ratio being a ratio of the number that rental of the vehicle in accordance with the reservation schedule information is performed to a reserved number, the second ratio being a ratio of the number that the rental of the vehicle in accordance with the reservation schedule information is not performed to the reserved number, and the reserved number being the number that rental of the vehicle is reserved based on the reservation schedule information.

According to this aspect, in the carsharing system, since it is curbed change of a movement schedule of a vehicle by an owner of the vehicle, it is possible to enable a service user to stably use the interior of the vehicle.

In the above aspect, the circuitry may be configured to provide information on vehicles in a recommended order in which a first vehicle or a second vehicle has priority when a plurality of vehicles satisfies the desired rental schedule, the first vehicle being a vehicle of an owner who has permitted provision of the movement schedule information, and the second vehicle being a vehicle of an owner who has high incentive points.

In a vehicle of which provision of movement schedule information has been permitted, there is a high likelihood that a reservation for rental of the interior of the vehicle will be performed as scheduled. In a vehicle of an owner with a high incentive point, there is a high likelihood that the owner will observe the movement schedule information and a reservation for rental of the interior of the vehicle (also referred to as a reservation for use of a service) will be performed as scheduled. Accordingly, according to this aspect, it is possible to enable a user to stably use the interior of the vehicle.

In the above aspect, the usage request may include information for specifying geographical conditions in which the vehicle rental service is provided, and the circuitry may be configured to provide information on vehicles which satisfy the geographical conditions with reference to position information of the vehicles which are supplied for the vehicle rental service. Accordingly, the carsharing system can provide a service by performing a process with a limitation to vehicles satisfying the geographical conditions in the vehicle rental service.

The carsharing system according to a second aspect of the disclosure includes circuitry configured to: store groups of a plurality of vehicles which are formed based on geographical position relationships correlated with the vehicles, the vehicles being supplied for a vehicle rental service; receive a usage request including a desired rental region of a vehicle which is supplied for the vehicle rental service; specify a group of vehicles associated with the desired rental region in response to the usage request; and provide information on the group of vehicles associated with the desired rental region.

According to this aspect, since information of groups of vehicles which are formed based on addresses is provided in response to the service usage request for the interior of a vehicle including a desired rental region, a user can reserve a group of vehicles without clearly reserving individual vehicles, and can be provided with a service using a vehicle belonging to the group after an actual schedule of the service or the like has been clarified.

In the above aspect, the usage request may be a service usage request for using a vehicle as a transportation destination of baggage. The circuitry may be configured to select, as a selected vehicle, one vehicle of the vehicles belonging to the group in response to a request for an access to the group which is issued from a terminal of a service user in charge of transportation of the baggage within a predetermined period from a scheduled transportation date and time at which transportation of the baggage is performed after the scheduled transportation date and time has been determined, and to control transmitting information for identifying the selected vehicle and access permission information for permitting an access to the interior of the selected vehicle to the terminal of the service user.

According to this aspect, a group of vehicles can be specified as a transportation destination of baggage, and a vehicle rental service using one vehicle of the vehicles belonging to the group can be provided after a scheduled transportation date and time at which transportation of baggage is performed has been determined. Accordingly, a user can be provided with a flexible service using a group of vehicles which is formed based on addresses correlated with the vehicles. According to another aspect of the disclosure, there is provided a method causing a computer to perform processes corresponding to the above-mentioned aspects of the carsharing system.

With the above-mentioned carsharing system, it is possible to reduce occurrence of problems with movement of a vehicle when the interior of the vehicle is used by more persons or the interior of the vehicle is shared by a plurality of persons.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating a configuration of a vehicle registration table;

FIG. 5 is a diagram illustrating a configuration of a cluster definition table;

FIG. 6 is a diagram illustrating a configuration of a cluster member table;

FIG. 7 is a diagram illustrating a configuration of an owner registration table;

FIG. 8 is a diagram illustrating a configuration of an owner evaluation table;

FIG. 9 is a diagram illustrating a configuration of a user registration table;

FIG. 10 is a diagram illustrating a configuration of movement schedule information;

FIG. 11 is a diagram illustrating a configuration of vehicle interior rental schedule information;

FIG. 16B is a later sequence diagram of the information system according to the second embodiment;

FIG. 19B is sequence diagram of the information system according to the third embodiment.

DETAILED DESCRIPTION OF EMBODIMENTS

Figure 1:
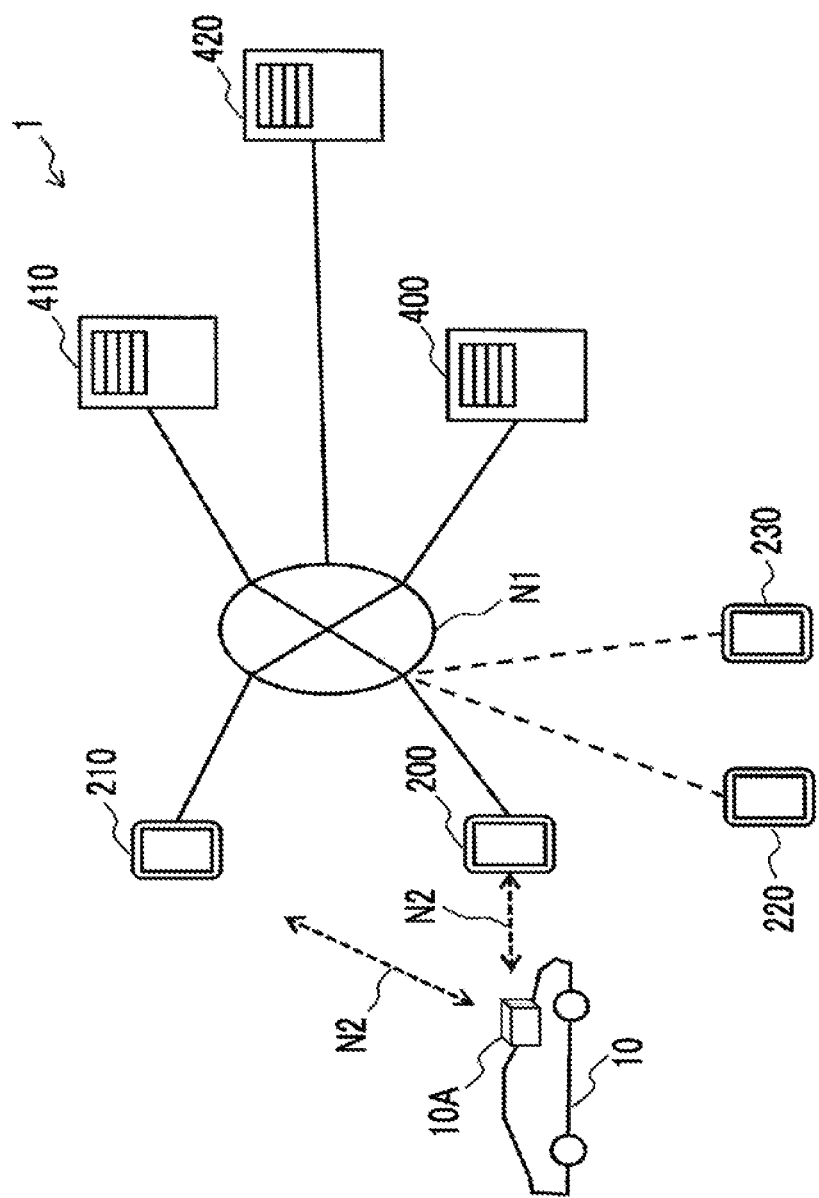
FIG. 1 is a diagram illustrating a configuration of a carsharing system according to a first embodiment.

Hereinafter, an information system according to an embodiment of the disclosure will be described. The embodiments which are described below exemplify aspects of the disclosure and the technical scope of the disclosure is not limited to the following aspects.

First Embodiment

An information system (hereinafter also referred to as a carsharing system 1) according to a first embodiment and a carsharing method of causing a computer of the information system to perform processes (steps) will be described below with reference to FIGS. 1 to 15.

<Image of Processing>

The information system according to this embodiment provides a service of supporting common use of the interior of a vehicle by a plurality of users and an owner of the vehicle. In this embodiment, an owner of a vehicle registers his or her vehicle in the information system and provides the vehicle as a vehicle of which the interior can be used by a single user or a plurality of users. The information system discloses an unoccupied state or a reserved state of the vehicle to users through a web site. A user of a vehicle accesses the web site, checks an unoccupied time of the vehicle, and reserves a time in which the interior of the vehicle is used. There are various methods of using the interior of a vehicle, and an example thereof is use of the interior of a vehicle as a delivery destination of baggage. That is, in this embodiment, the interior of a vehicle is used, for example, as a delivery box or a pickup box in home delivery. Accordingly, a delivery person of a home delivery company and a receiver who receives delivered baggage are assumed as users of this service. Therefore, a delivery person of a home delivery company is an example of a service user. In this embodiment, the service is not limited to delivery, and also includes pickup. Delivery and pickup can be said to be transportation. Accordingly, a service user also includes a person in charge of pickup of a home delivery company. In addition to a staff member or an employee of a home delivery company, examples of the service user include persons in charge of other services such as a person in charge of milk delivery, a person in charge of newspaper delivery, a person in charge of postal delivery, and an article exchange service provider. Examples of the service user include general citizens or consumers when the general citizens or consumers deliver, receive, or give and receive baggage, in addition to a service provider who provides a service as business. In the following description, "delivery" is exemplified as an activity which is performed by a service user in the carsharing service, but examples of the service user include employees who work for various businesses, general consumers, and citizens.

When the interior of a vehicle is used as a delivery destination of baggage, baggage under delivery may not be able to be accommodated therein depending on a relationship between the size of baggage under delivery and the capacity of the interior of the vehicle or a relationship between the size of baggage under delivery and a remaining capacity of the interior of the vehicle other than baggage which has been already delivered and stored. An aspect of this embodiment reduces this problem. That is, the information system groups supplied vehicles based on geographical position relationships such as addresses or distances between the vehicles. Grouping is referred to as clustering. A group of vehicles is referred to as a cluster. When baggage under delivery cannot be accommodated in the interior of a vehicle to which the baggage is scheduled to be delivered, the information system determines another vehicle belonging to the same group as an alternative delivery destination and notifies a delivery person and a receiver of the determination via a terminal of the delivery person. That is, the information system manages, for example, the interiors of a plurality of vehicles which are supplied in one region as a cluster and flexibly copes with sizes or volumes of delivery objects.

In another aspect of this embodiment, a movement schedule indicating a schedule in which a vehicle will be moved by an owner or the like is managed in addition to a reservations schedule for use of the interior of the vehicle by a user as the premise of scheduling of a reservation for the interior of a vehicle. That is, an owner of a vehicle can supply a movement schedule of the vehicle in supplying the vehicle. The information system manages both a use schedule of the interior of a vehicle and a movement schedule of the vehicle and provides a vehicle which can satisfy a user's desire to the user. Here, a movement schedule includes, for example, a schedule in a case where an owner of a vehicle does not drive the vehicle but the vehicle moves by an automatic driving function and a schedule in a case where a vehicle moves by unmanned driving, in addition to a case where an owner of a vehicle drives the vehicle.

Since a service quality is improved due to this information system, the information system offers predetermined incentive points to an owner who provides a movement schedule of a vehicle. When a user can use the interior of a vehicle as scheduled without any inconvenience by observing the movement schedule of the vehicle, the information system offers predetermined incentive points to the owner of the vehicle.

<System Configuration>

FIG. 1 is a diagram illustrating a configuration of the information system according to the first embodiment. In the example illustrated in FIG. 1, a carsharing system 1 includes an onboard device 10A which is installed in a vehicle 10, a user terminal 200, an owner terminal 210, a central server 400, a rental management server 410, and an external server 420. The onboard device 10A, the user terminal 200, the owner terminal 210, the central server 400, the rental management server 410, and the external server 420 are connected to each other via a network N1. The onboard device 10A is connected to the user terminal 200 or the owner terminal 210 via a network N2 including a short-range wireless communication network. More specifically, the user terminal 200 is used as a deliverer terminal 220 of a home delivery company or a receiver terminal 230 which is used by a receiver of baggage.

The rental management server 410 receives registration of a vehicle which is supplied for a carsharing service from the owner terminal 210. At the time of registration of a vehicle, the rental management server 410 receives information for identifying the vehicle (such as a registration number, a vehicle model, and a color of the vehicle). At the time of registration of a vehicle, the rental management server 410 checks whether a movement schedule of the vehicle has been provided via the owner terminal 210. The movement schedule of the vehicle is provided by an owner having issued a response indicating that the movement schedule is to be provided. The owner of the vehicle can register information on the vehicle which is supplied and the movement schedule of the vehicle of the owner having agreed to the provision through a predetermined application program (hereinafter simply referred to as an application) which is installed in the owner terminal 210.

The rental management server 410 provides a vehicle interior rental schedule to the user terminal 200 through the web site in order to enable a reservation for the interior of the vehicle which is registered by the owner terminal 210. A user can specify a vehicle satisfying the user's desired use conditions, for example, by inputting a desired use region, a desired use date and time, or the like through the predetermined application installed in the user terminal 200. As described above, in the information system, vehicles are grouped into groups which are called clusters based on regions, and the information system determines whether a desired use region is possible based on the clusters of vehicles. The information system determines whether a desired use date and time is satisfied by comparison based on both the rental schedules of the vehicles and the movement schedules of the vehicles. When there is a vehicle satisfying the user's desired use conditions, the rental management server 410 presents the vehicle to the user terminal 200, receives an acknowledgement from the user terminal 200, and then registers the vehicle in a cargo compartment rental schedule.

<Hardware Configuration>

Figure 2:
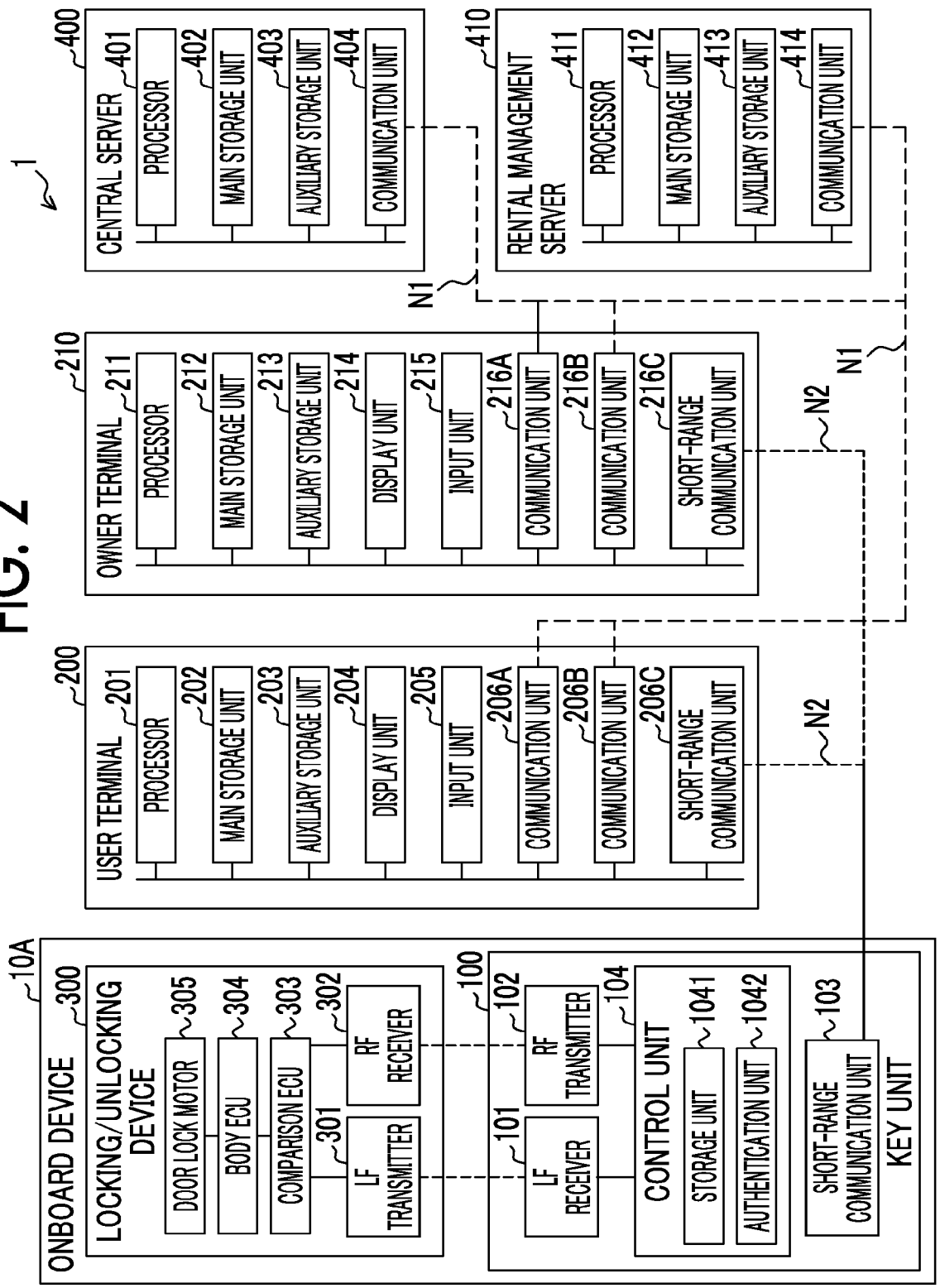
FIG. 2 is a diagram illustrating hardware configurations of an onboard device, a user terminal, an owner terminal, a central server, and a rental management server.

FIG. 2 is a diagram illustrating hardware configurations of the onboard device 10A, the user terminal 200, the owner terminal 210, the central server 400, and the rental management server 410. The configurations of the deliverer terminal 220 and the receiver terminal 230 are the same as that of the user terminal 200 and thus are not illustrated in FIG. 2. The configuration of the external server 420 is the same as that of the central server 400 and thus is not illustrated in FIG. 2. In this embodiment, it is assumed that the disclosure is applied to a vehicle 10 which performs locking and unlocking via a key unit 100 disposed in the onboard device 10A. The key unit 100 includes the same wireless interface as an electronic key (hereinafter referred to as a portable unit) which is called a smart key and performs communication with an existing locking/unlocking device 300 of the onboard device 10A. For example, a user can lock and unlock the vehicle 10 without using a physical key by performing authentication with the key unit 100 using terminal authentication information stored in the user terminal 200. That is, the key unit 100 performs short-range wireless communication with a mobile terminal such as the user terminal 200 or the owner terminal 210 (hereinafter referred to as a user terminal 200 or the like) and determines whether the key unit functions as an electronic key to the vehicle 10 based on the authentication result of the user terminal 200 or the like.

The terminal authentication information which is transmitted from the user terminal 200 or the like to the key unit 100 is compared with device authentication information which is stored in advance in the key unit 100. When the authentication has succeeded, the user terminal 200 or the like is authenticated. When the user terminal 200 or the like is authenticated, the key unit 100 transmits a key ID of the vehicle 10, which is stored in advance in the key unit 100 and is correlated with authentication information, to the locking/unlocking device 300 along with a locking/unlocking signal. When the key ID received from the key unit 100 coincides with a key ID which is stored in advance in the locking/unlocking device 300, the locking/unlocking device 300 locks or unlocks the vehicle 10. The key ID stored in advance in the key unit 100 may be encrypted with the authentication information. In this case, when the authentication process of the user terminal 200 or the like succeeds, the key unit 100 can decrypt the key ID with the authentication information and transmit the decrypted key ID to the locking/unlocking device 300.

The owner terminal 210 of the owner who is an occupier of the vehicle 10 stores master authentication information which can be authenticated by the key unit 100 and the owner can lock and unlock the vehicle 10 at any time. Here, "at any time" means that a valid period is not set in the master authentication information and thus the owner can lock and unlock the vehicle 10 at any time in this embodiment. On the other hand, at the time of acquisition of baggage in the interior of the vehicle or the like, the user terminal 200 receives terminal authentication information for unlocking and locking the vehicle 10 from the central server 400 or the rental management server 410. The user terminal 200 transmits the received terminal authentication information to the key unit 100, and the key unit 100 transmits the key ID of the vehicle 10 stored in advance in the key unit 100 to the locking/unlocking device 300 when authentication of the user terminal 200 by the key unit 100 has succeeded. The locking/unlocking device 300 locks and unlocks the vehicle 10 when the key ID received from the key unit 100 coincides with the key ID stored in advance in the locking/unlocking device 300. The key unit 100 and the locking/unlocking device 300 operate with electric power supplied from a battery which is mounted in the vehicle 10. The key unit 100 may operate with electric power supplied from a general battery in addition to the battery mounted in the vehicle 10.

The locking/unlocking device 300 is a device for locking and unlocking a door of the vehicle 10 and is an existing device which constitutes a part of a smart keying system. Specifically, the locking/unlocking device 300 locks and unlocks the door of the vehicle 10 in accordance with a locking signal and an unlocking signal which are transmitted from a portable unit carried by a user of the vehicle 10 using radio waves of a radio frequency (hereinafter referred to as RF) band. The locking/unlocking device 300 also has a function of transmitting radio waves of a low frequency (hereinafter referred to as LF) band for detecting a portable unit.

In this embodiment, instead of the portable unit carried by the user, the key unit 100 may control locking and unlocking of the door of the vehicle 10 by transmitting and receiving radio waves of an RF band and an LF band to and from the locking/unlocking device 300. In the following description, unless mentioned otherwise, a communication destination of the locking/unlocking device 300 is limited to the key unit 100.

The locking/unlocking device 300 includes an LF transmitter 301, an RF receiver 302, a comparison ECU 303, a body ECU 304, and a door lock motor 305. The LF transmitter 301 is means that transmits radio waves of an LF band (for example, 100 KHz to 300 KHz) for detecting (polling) the key unit 100. The LF transmitter 301 is incorporated, for example, in a center console or the vicinity of a steering wheel in a passenger compartment. The RF receiver 302 is means that receives radio waves of an RF band (for example, 100 MHz to 1 GHz) transmitted from the key unit 100. The RF receiver 302 is incorporated at a position in the passenger compartment.

The comparison ECU 303 is a computer that performs control for locking and unlocking the door of the vehicle 10 (or a door of a cargo compartment or both) based on a signal (a locking signal or an unlocking signal) transmitted from the key unit 100 using the radio waves of the RF band. The comparison ECU 303 is constituted, for example, by a microcomputer. In the following description, the locking signal and the unlocking signal are collectively referred to as a locking/unlocking signal. The term, locking/unlocking signal, represents at least one of the locking signal and the unlocking signal.

The comparison ECU 303 authenticates whether the locking/unlocking signal transmitted from the key unit 100 has been transmitted from a rightful device. Specifically, the comparison ECU 303 determines whether the key ID included in the locking/unlocking signal coincides with the key ID stored in advance in a storage unit of the comparison ECU 303. Then, the comparison ECU 303 transmits an unlocking command or a locking command to the body ECU 304 based on the authentication result. The unlocking command or the locking command is transmitted via an onboard network such as a controller area network (CAN).

The body ECU 304 is a computer that executes body control of the vehicle 10. The body ECU 304 has a function of performing unlocking and locking of the door of the vehicle 10 by controlling the door lock motor 305 based on the unlocking command or the locking command received from the comparison ECU 303. The door lock motor 305 is an actuator that locks and unlocks the door of the vehicle 10 (which includes a cargo compartment in addition to a boarding door and a rear gate). The door lock motor 305 operates based on a signal transmitted from the body ECU 304. The comparison ECU 303 and the body ECU 304 may be embodied as a single body.

The key unit 100 will be described now. The key unit 100 is a device that is disposed at a predetermined position (for example, inside a glove box) in the passenger compartment of the vehicle 10. The key unit 100 has a function of authenticating the user terminal 200 or the like by performing short-range radio communication with the user terminal 200 or the like and a function of transmitting the locking/unlocking signal using radio waves of an RF band based on the authentication result. The key unit 100 includes an LF receiver 101, an RF transmitter 102, a short-range communication unit 103, and a control unit 104.

The LF receiver 101 is means that receives a polling signal transmitted from the locking/unlocking device 300 using radio waves of an LF band. The LF receiver 101 includes an antenna for receiving radio waves of an LF band (hereinafter referred to as an LF antenna). The RF transmitter 102 is means that transmits a locking/unlocking signal to the key unit 100 using radio waves of an RF band.

The short-range communication unit 103 is means that communicates with the user terminal 200 or the like carried by the user. The short-range communication unit 103 performs communication in a short range (at a distance at which communication can be performed between the inside and the outside of the vehicle) using a predetermined radio communication standard.

In this embodiment, the short-range communication unit 103 performs data communication based on a Bluetooth (registered trademark) Low Energy standard (hereinafter referred to as BLE). BLE is a low-energy communication standard using Bluetooth, and is characterized in that communication can be started immediately when a communication partner is detected without requiring pairing between devices. In this embodiment, BLE is exemplified, but another radio communication standard can also be used. For example, near field communication (NFC), ultra-wideband (UWB), or WiFi (registered trademark) may be used.

The control unit 104 is a computer that performs short-range radio communication with the user terminal 200 via the short-range communication unit 103 and performs control for authenticating the user terminal 200 or the like and control for transmitting a locking/unlocking signal based on the authentication result. The control unit 104 is constituted, for example, by a microcomputer.

The control unit 104 includes a storage unit 1041 and an authentication unit 1042. A control program for controlling the key unit 100 is stored in the storage unit 1041. The control unit 104 may realize various functional units including the authentication unit 1042 by causing a CPU (not illustrated) to execute the control program stored in the storage unit 1041. For example, the control unit 104 may realize a function of receiving a polling signal transmitted as radio waves of an LF band from the locking/unlocking device 300 via the LF receiver 101, a function of transmitting a locking/unlocking signal as radio waves of an RF band to the locking/unlocking device 300 via the RF transmitter 102, a function of processing communication with the user terminal 200 or the like which is performed by the short-range communication unit 103, and a function of generating a locking/unlocking signal when authentication of the user terminal 200 or the like by the authentication unit 1042 has succeeded.

The authentication unit 1042 authenticates the user terminal 200 or the like based on terminal authentication information included in a locking request or an unlocking request (hereinafter collectively referred to as a locking/unlocking request) transmitted from the user terminal 200 or the like. Specifically, the authentication unit 1042 compares the terminal authentication information transmitted from the user terminal 200 or the like with the device authentication information stored in the storage unit 1041 and determines that the authentication has succeeded when they have a predetermined relationship. When the terminal authentication information and the device authentication information do not satisfy the predetermined relationship, the authentication unit 1042 determines that the authentication has failed. Here, the predetermined relationship includes a case in which the device authentication information stored in the storage unit 1041 and the terminal authentication information transmitted from the user terminal 200 or the like coincide with each other, a case in which results of predetermined processes such as encryption and decryption using the two pieces of authentication information coincide with each other, and a case in which the result of decryption on one of the two pieces of authentication information coincides with that of the other thereof.

When the authentication of the user terminal 200 or the like by the authentication unit 1042 has succeeded, a locking/unlocking signal which is generated in response to a request received from the user terminal 200 or the like is transmitted to the locking/unlocking device 300 via the RF transmitter 102. The authentication method which is performed by the authentication unit 1042 as described above may be a method of verifying coincidence through simple comparison of authentication information or may be a method using asymmetric ciphers. As described above, in the following description of this embodiment, the authentication information stored in the key unit 100 is referred to as device authentication information and the authentication information transmitted from the user terminal 200 is referred to as terminal authentication information. As described above, the key unit 100 transmits an ID of an electronic key (hereinafter referred to as a key ID) to the locking/unlocking device 300 along with the locking/unlocking signal.

The rental management server 410 has a configuration of a general computer. The rental management server 410 includes a processor 411, a main storage unit 412, an auxiliary storage unit 413, and a communication unit 414. These units are connected to each other via a bus. The main storage unit 412 and the auxiliary storage unit 413 are computer-readable recording mediums. The hardware configuration of the computer is not limited to the example illustrated in FIG. 2, and omission, substitution, and addition of an element may be appropriately performed thereon.

The rental management server 410 can realize functions matching a predetermined purpose by causing the processor 411 to load a program stored in a recording medium into a work area of the main storage unit 412 and to execute the program and controlling the constituent units and the like through execution of the program.

The processor 411 is, for example, a central processing unit (CPU) or a digital signal processor (DSP). The processor 411 controls the rental management server 410 and performs various information processing operations. The main storage unit 412 includes, for example, a random access memory (RAM) and a read only memory (ROM). The auxiliary storage unit 413 is, for example, an erasable programmable ROM (EPROM), a hard disk drive (HDD), or a solid state drive (SSD). The auxiliary storage unit 413 can include a removable medium, that is, a portable recording medium. Examples of the removable medium include a universal serial bus (USB) memory or a disk recording medium such as a compact disc (CD) or a digital versatile disc (DVD).

The auxiliary storage unit 413 stores various programs, various types of data, and various tables on a recording medium in a readable and writable manner. An operating system (OS), various programs, various tables, and the like are stored in the auxiliary storage unit 413. Information stored in the auxiliary storage unit 413 may be stored in the main storage unit 412. Information stored in the main storage unit 412 may be stored in the auxiliary storage unit 413.

The communication unit 414 is connected to other devices and controls communication between the rental management server 410 and other devices. The communication unit 414 is, for example, a local area network (LAN) interface board or a radio communication circuit for radio communication. The LAN interface board or the radio communication circuit is connected to the network N1 such as the Internet which is a public communication network.

A sequence of processes which are performed by the rental management server 410 can be realized by causing the processor 411 to execute a computer program (also referred to as software) in the main storage unit 412, and at least a part of the sequence of processes may be performed by a hardware circuit.

Similarly to the rental management server 410, the central server 400 includes a processor 401, a main storage unit 402, an auxiliary storage unit 403, and a communication unit 404. The processor 401, the main storage unit 402, the auxiliary storage unit 403, and the communication unit 404 are the same as the processor 411, the main storage unit 412, the auxiliary storage unit 413, and the communication unit 414 of the rental management server 410 and thus description thereof will not be repeated.

The user terminal 200 and the owner terminal 210 are, for example, a small computer such as a smartphone, a mobile phone, a tablet terminal, a personal information terminal, or a wearable computer (such as a smart watch). The owner terminal 210 may be a personal computer (PC) that is connected to the rental management server 410 via the network N1 such as the Internet which is a public communication network.

The owner terminal 210 includes a processor 211, a main storage unit 212, an auxiliary storage unit 213, a display unit 214, an input unit 215, a communication unit 216A, a communication unit 216B, and a short-range communication unit 216C. The processor 211, the main storage unit 212, and the auxiliary storage unit 213 are the same as the processor 411, the main storage unit 412, and the auxiliary storage unit 413 of the rental management server 410 and description thereof will not be repeated. The display unit 214 is, for example, a liquid crystal display (LCD) or an electroluminescence (EL) panel. The input unit 215 includes a touch panel and push buttons. The input unit 215 can include an input unit for a video or an image such as a camera or an input unit for sound such as a microphone. The communication unit 216A is a communication circuit that is used to access the Internet, for example, via a mobile phone network with a base station as a terminal. The communication unit 216B is a communication circuit that accesses the Internet, for example, via a wireless or wired LAN and performs data communication with the rental management server 410 or the like. The short-range communication unit 216C is a communication circuit that performs short-range communication in accordance with a predetermined communication standard. Examples of the predetermined communication standard include BLE and NFC.

Similarly to the owner terminal 210, the user terminal 200 includes a processor 201, a main storage unit 202, an auxiliary storage unit 203, a display unit 204, an input unit 205, a communication unit 206A, a communication unit 206B, and a short-range communication unit 206C. The processor 201, the main storage unit 202, the auxiliary storage unit 203, the display unit 204, and the input unit 205 are the same as the processor 211, the main storage unit 212, the auxiliary storage unit 213, the display unit 214, and the input unit 215 of the owner terminal 210 and description thereof will not be repeated. The communication unit 206A is a communication circuit that accesses the Internet, for example, via a mobile phone network with a base station as a terminal. The communication unit 206B is a radio communication circuit that accesses the Internet, for example, via a wireless LAN such as WiFi. The user terminal 200 can perform data communication with the rental management server 410, the central server 400, or the like via the communication unit 206B. The short-range communication unit 206C controls communication with the vehicle 10 at a relatively short distance in accordance with a predetermined communication standard. Examples of the predetermined communication standard include BLE and NFC.

The network N1 is, for example, a global public communication network such as the Internet, and a wide area network (WAN) or other communication networks may be employed. The network N1 may include a telephone communication network of mobile phones and the like and a wireless communication network such as WiFi. The user terminal 200 and the owner terminal 210 can access the Internet via a telephone communication network for mobile phones or the like or a wireless communication network such as WiFi. The network N2 includes a communication network such as BLE for allowing the user terminal 200 and the owner terminal 210 to communicate with the onboard device 10A. The user terminal 200 and the owner terminal 210 can communicate with the onboard device 10A via a short-range communication network such as BLE.

<Detailed Configuration of Rental Management Server>

Figure 3:
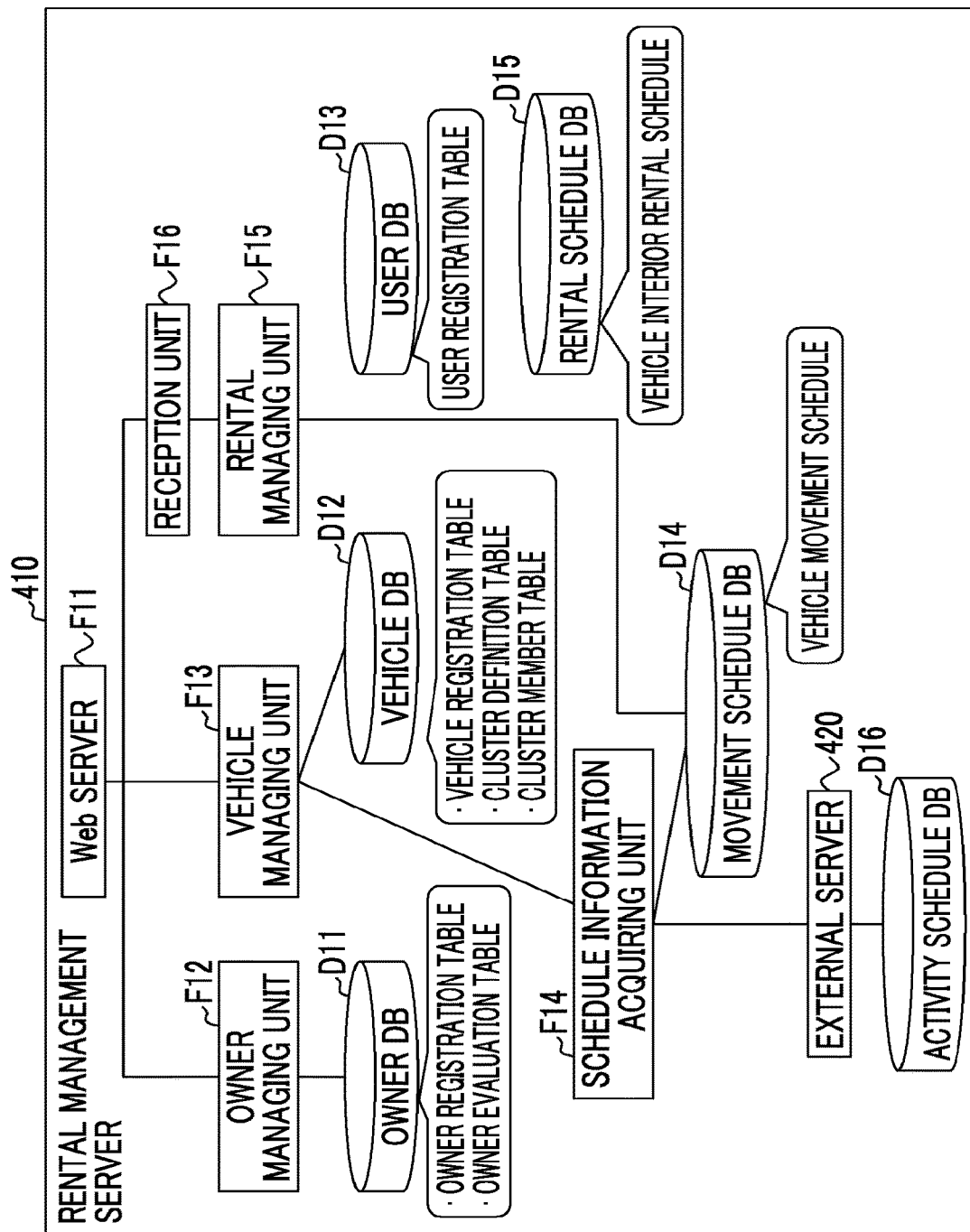
FIG. 3 is a diagram illustrating specific elements that perform processes of the rental management server.

FIG. 3 is a diagram illustrating details of elements that perform a process routine of the rental management server 410. As illustrated in the drawing, the rental management server 410 includes a web server F11, an owner managing unit F12, a vehicle managing unit F13, a schedule information acquiring unit F14, a rental managing unit F15, and a reception unit F16 as processing units that perform the process routine. The rental management server 410 also includes an owner DB D11, a vehicle DB D12, a user DB D13, a movement schedule DB D14, and a rental schedule DB D15 as databases (DB) that manage a variety of information. As described above, the processor 411 of the rental management server 410 serves as the processing units illustrated in FIG. 3 using a computer program loaded into the main storage unit 412. At least a part of the processing units may be embodied by a hardware circuit. The processor 411 constructs the DBs in the main storage unit 412 and the auxiliary storage unit 413. The DBs may be constructed on a server for data input and output (not illustrated) which is connected to the rental management server 410 via the network N1.

The web server F11 is a computer program which is loaded into the main storage unit 412 and is executed by the processor 411. In the following description, when the processor 411 performs processing in accordance with a computer program, it may be simply described that the computer program performs processing. The web server provides information associated with a carsharing service to a user in cooperation with the processing units and the DBs illustrated in FIG. 3. For example, the web server F11 may provide schedule information of vehicles which are supplied for the carsharing service or the like based on information in the rental schedule DB D15. The web server F11 receives an input from the owner terminal 210 or the user terminal 200 and sends the input information to the processing units.

The owner managing unit F12 receives information on an owner of a vehicle from the owner terminal 210 or a terminal (not illustrated) installed in a vehicle shop via the web server F11 and stores the received information in the owner DB D11. The vehicle managing unit F13 receives information on vehicles which are supplied for the carsharing service from the owner terminal 210 or a terminal installed in a vehicle shop via the web server F11 and stores the received information in the vehicle DB D12.

The schedule information acquiring unit F14 receives vehicle movement schedule information for an owner from the owner terminal 210 and stores the received movement schedule information in the movement schedule DB D14. The schedule information acquiring unit F14 may extract movement schedule information from an activity schedule DB D16 of an owner which is managed by the external server 420 by designation from the owner terminal 210. For example, the schedule information acquiring unit F14 can set time periods of an activity schedule including terms for designating driving of a vehicle, for example, "driving" or "transportation," in the owner activity schedule stored in the activity schedule DB D16 as time periods in which the vehicle is driven in the activity schedule DB D16. When "staying home" is set in the activity schedule DB D16, the schedule information acquiring unit F14 can register a record indicating that there is no movement schedule in the movement schedule DB D14.

The activity schedule DB D16 can include scheduled activity items such as "drive," "operation," and "transportation" in addition to scheduled activity items defining an activity schedule such as "conference," "business trip," and "visitor." Such scheduled activity items can be selected by a user using a setting menu of a graphical user interface (GUI) of the activity schedule DB D16 or the like and can be set in the activity schedule DB D16. The activity schedule DB D16 can set a vehicle ID for identifying a vehicle which is used in the scheduled activity items such as "drive," "operation," and "transportation." The activity schedule DB D16 can include a conversion table in which a vehicle ID in the activity schedule DB D16 is correlated with a vehicle ID for identifying the vehicle in the vehicle DB D12 (see FIG. 4). When the activity schedule DB D16 has such a configuration, the schedule information acquiring unit F14 can more satisfactorily extract a movement schedule of a vehicle (which includes automatic driving or the like) for an owner from the activity schedule DB D16.

That is, the schedule information acquiring unit F14 acquires movement schedule information indicating movement schedules of vehicles which are supplied for a vehicle interior rental service by input from the owner terminal 210 or extraction of a term from the activity schedule information of owners. Accordingly, the movement schedule information is generated, for example, based on activity schedule information in which activity schedules of owners of vehicles are set.

The reception unit F16 receives an input of a user from the user terminal 200 via the web server F11. The rental managing unit F15 registers information for identifying the user in the user DB D13 based on the input received by the reception unit F16. The reception unit F16 receives a service usage request including desired rental conditions such as a region desired by a user and a desired rental date and time. The rental managing unit F15 compares the desired rental conditions received by the reception unit F16 with the rental schedule DB D15 and the movement schedule DB D14, selects vehicles which satisfy the received desired rental conditions, and presents a list of the selected vehicles to the user terminal 200. The reception unit F16 receives a user's selecting operation on the presented list of vehicles. The rental managing unit F15 registers a rental schedule of the vehicle selected by the user in the rental schedule DB D15 based on the user's desired rental date and time. Here, the desired rental date and time is an example of a desired rental schedule. Accordingly, the reception unit F16 receives a usage request including a desired rental schedule of the vehicle interior in the vehicle rental service, and the rental managing unit F15 provides information on the vehicle satisfying the desired rental schedule in both the reservation schedule information and the movement schedule information. As described above, in the service usage request received by the reception unit F16, a region in which a parking lot in which a vehicle to be rented is housed is located may be designated. The rental managing unit F15 is an example of a management unit.

The external server 420 stores, for example, the activity schedule DB D16 in which activity schedules of owners are stored. The external server 420 provides the activity schedule of the owner to the schedule information acquiring unit F14 in response to a request from the rental management server 410.

<Configuration of Database>

Data structures of the DBs in the information system will be described below. As illustrated in FIG. 3, the owner DB D11 includes a plurality of tables such as an owner registration table and an owner evaluation table. The vehicle DB D12 includes a plurality of tables such as a vehicle registration table, a cluster definition table, and a cluster member table. On the other hand, the user DB D13 includes a user registration table, the movement schedule DB D14 includes movement schedules of vehicles, and the rental schedule DB D15 includes vehicle interior rental schedules.

FIG. 4 is a diagram illustrating a configuration of the vehicle registration table of the vehicle DB D12. The vehicle registration table is a table in which vehicles supplied for a carsharing service using the information system according to this embodiment are registered. When an owner of a vehicle supplies the vehicle for the carsharing service, the owner inputs information for identifying the vehicle via a screen (for example, a GUI on the web site) which is provided to the owner terminal 210 by the web server F11 and the vehicle managing unit F13. The vehicle managing unit F13 registers the input information in the vehicle registration table.

Each row in the table illustrated in FIG. 4 represents one record of the vehicle registration table (the same is true of tables illustrated in FIGS. 5 to 11). Each record of the vehicle registration table includes fields of vehicle ID, registration number, owner ID, parking lot address, parking lot position, vehicle manufacturer, popular name, color, year of registration, movement limiting conditions, and onboard communication device address. The vehicle ID is information for uniquely identifying a vehicle. The vehicle ID is information which is set, for example, by the vehicle managing unit F13. "Unique" means that each vehicle can be identified exclusively in the information system. In the following description, "unique" has the same meaning. The registration number is an automobile registration number of a vehicle and includes a character string indicating a branch office of the transportation bureau/office for motor vehicle inspection and registration, a character string indicating a model of the vehicle, a character indicating whether the vehicle is an owner-driven car, and a type designation number.

The owner ID is information for uniquely identifying an owner of a vehicle which is registered in the carsharing service using the information system according to this embodiment. For example, the owner ID may be the same information as information which was registered in the central server 400 when the owner purchased the vehicle. The parking lot address is, for example, an address indicating a housing location of the vehicle described in a garage certificate. The parking lot position is information indicating the parking lot address, for example, using a latitude and longitude. The vehicle manufacturer is information indicating a manufacturer having manufactured the vehicle. The popular name is a nickname of the vehicle and is a product name which is given to the vehicle sold by the vehicle manufacturer. The popular name may be mentioned as a "vehicle model." The color is a color of the vehicle. When the vehicle is painted in two or more colors, a predetermined number of colors may be disposed from the color having the largest surface area as the color. The year of registration is a year of registration of the vehicle shown in a vehicle inspection certificate.

The movement limiting conditions represent conditions for vehicle movement limiting which are agreed by the owner of the vehicle. For example, a movement limiting condition may be that a movement range is limited to a specific region (in the C2-shi). The movement limiting condition may include designation of a date and time. For example, a movement limiting condition is that the vehicle may be fixed to a parking lot of the home on weekdays. For example, a movement limiting condition is that the vehicle may be fixed to the parking lot of the home from 21:00 every day to 7:00 on the next day. The movement limiting conditions may be temporary. For example, a movement limiting condition may be that the vehicle is fixed to a specific geographical position on a specific date and time. The onboard communication device address is an address on a public network of an onboard communication device which is incorporated into the onboard device 10A and which can communicate wirelessly. For example, the address may be a phone number on a mobile phone network. For example, the onboard communication device may be a communication device which can access a base station of a mobile phone network. The onboard device 10A can access a public network (for example, the Internet) via the mobile phone network using the onboard communication device.

FIG. 5 is a diagram illustrating a configuration of the cluster definition table in the vehicle DB D12. The cluster definition table is a table in which cluster requirements for grouping a plurality of vehicles into clusters are defined. The cluster definition table may be prepared by the vehicle managing unit F13 in response to a setting operation from a manager of the information system.

A cluster is formed based on at least one of geographical positions such as locations of parking lots at which vehicles are parked, movement ranges of the vehicles, activity ranges of owners of the vehicles, and friendship ranges of the owners. For example, the movement range of a vehicle may be set by causing an owner thereof to set a movement range of the vehicle at the time of registration of the vehicle. The movement range of a vehicle can be designated by a maximum distance from the position of the parking lot address or the like. The movement range may be designated as a polygonal area with a vertex array of latitude and longitude. The activity range of an owner of a vehicle can be exemplified as a living range of the owner of the vehicle, the vicinity of an address of a place of work, or the like. A cluster which is formed based on locations of parking lots or movement ranges of vehicles is an example of a group of vehicles which are formed based on the geographical position relationship correlated with the vehicles.

The activity range of an owner of a vehicle can be designated by an address, a maximum distance from the address, and the like. A cluster which is formed based on the activity range of an owner of a vehicle is an example of a group of vehicles which is formed based on the geographical position relationship correlated with the vehicles. The friendship range of an owner refers to, for example, a range of persons associated with the owner and can be specified, for example, by a name, an address, and a friendship in SNS. Since the friendship range of an owner is associated with addresses of owners and friends and the like, a cluster which his formed based on the friendship range of an owner is an example of a group of vehicles which are formed based on the geographical position relationship correlated with the vehicles.

Each record in the cluster definition table includes a cluster ID, a cluster address, and a cluster position range. The cluster ID is information for uniquely identifying a cluster. The cluster address is an address part which is commonly included in parking lot addresses of vehicles included in the cluster. For example, when a cluster address is C2-shi, P1-ken, the parking lot addresses of vehicles included in the corresponding cluster include "C2-shi, P1-ken" and it can be understood that vehicles of the region are grouped. The cluster position range defines a range of the parking lot addresses of vehicles included in the corresponding cluster using a polygon including latitude and longitude. For example, a rectangular cluster position range can include latitude and longitude of an upper-left vertex (X1, Y1) and a lower-right vertex (X2, Y2) of the range of the parking lot addresses of the vehicles included in the cluster.

FIG. 6 is a diagram illustrating a configuration of the cluster member table in the vehicle DB D12. The cluster member table is a table for classifying vehicles which are supplied for the carsharing service provided by the information system into clusters. In this embodiment, a vehicle belongs to at least one cluster. Each record of the cluster member table includes a cluster ID, the number of registered vehicles, and an array of vehicle IDs. The cluster ID is the same ID as defined in the cluster definition table and description thereof will not be repeated. The number of registered vehicles is the number of vehicles belonging to the corresponding cluster. The array of vehicle IDs is an array of vehicle IDs of the vehicles belonging to the corresponding cluster. In the cluster member table, the maximum value of the number of registered vehicles may be limited. The cluster member table is an example of a group storage unit.

FIG. 7 is a diagram illustrating a configuration of the owner registration table in the owner DB D11. The owner registration table defines owners of vehicles which are supplied for the carsharing service provided by the information system. The owner registration table includes an owner ID, a name, an address, and a password. The owner ID is information for uniquely identifying an owner in the information system. As described above, the owner ID may be common to that which an owner of a vehicle registers in the central server 400 at the time of purchase of the vehicle. The name is a name of an owner. The address is an address at which the owner lives.

The owner ID and the password are given to the owner by the central server 400 when an owner of a vehicle purchases the vehicle. That is, the owner ID and the password are managed along with device authentication information of the key unit 100 and terminal authentication information by the central server 400. An owner can be subjected to reissuance of terminal authentication information corresponding to device authentication information of the key unit 100 mounted in the vehicle 10 by causing the central server 400 to authenticate the owner with the owner ID and the password.

FIG. 8 is a diagram illustrating a configuration of the owner evaluation table in the owner DB D11. The owner evaluation table includes an owner ID, provision of a movement schedule, agreement to movement limiting, a monthly frequency of vehicle interior rental change due to change of a schedule, a monthly frequency of vehicle interior rental implementation, and a monthly sum of incentive points. Here, the owner ID is the same as illustrated in FIGS. 6 and 7. The provision of a movement schedule is information indicating whether an owner identified by the owner ID agrees to provision of a movement schedule. When the owner supplies a plurality of vehicles for the carsharing service, the provision of a movement schedule may be set for each vehicle. Points may be added with a unit point of 1 in a case in which movement schedules of a plurality of vehicles are provided, and the added points may be set in the table illustrated in FIG. 8.

The monthly frequency of vehicle interior rental change due to change of a schedule represents a monthly frequency in which a movement schedule of a vehicle is changed by an owner's circumstances and a reservation for rental of the interior of a vehicle is changed to another vehicle. The monthly frequency of vehicle interior rental implementation represents a monthly frequency in which a reservation for rental of the interior of a vehicle is implemented without changing the movement schedule of the vehicle (or regardless of whether the movement schedule has changed). The monthly sum of incentive points represents a monthly sum of incentive points which are offered to the owner and which is calculated based on the provision of a movement schedule, the monthly frequency of vehicle interior rental change due to change of a schedule, and the monthly frequency of vehicle interior rental implementation. In this embodiment, the owner evaluation table evaluates owners for each month, but the evaluation of owners is not limited to a month and the information system can evaluate owners in various evaluation periods such as a week, a season, and a year.

FIG. 9 is a diagram illustrating a configuration of the user registration table in the user DB D13. The user registration table defines owners who receive the carsharing service provided by the information system. The user registration table includes a user ID, a name, an address, and password. The user ID is information for uniquely identifying a user in the information system. The name is a name of a user. The address is an address at which a user lives. The password is a password which a user applies for the user ID and which is accepted by the information system.

When authentication of a user using the corresponding user ID and the corresponding password has succeeded, the rental managing unit F15 of the rental management server 410 transmits a request for issuance of terminal authentication information for using a vehicle which will be used by a user to the central server 400. The request for issuance includes an owner ID and a password of the vehicle which is rented to the user. The central server 400 authenticates the request for issuance using the owner ID and the password of the vehicle in response to the request for issuance of terminal authentication information from the rental management server 410. When the authentication has succeeded, the central server 400 manages temporary issuance of terminal authentication information which is authenticated by the key unit 100 correlated with the vehicle ID of the owner ID and the vehicle, that is, issuance of a one-time key. That is, the central server 400 issues a one-time key for the user terminal 200 in response to the request for issuance of terminal authentication information from the rental managing unit F15.

FIG. 10 is a diagram illustrating a configuration of movement schedule information in the movement schedule DB D14. The movement schedule information records a movement schedule for each vehicle. Each record of the movement schedule includes, for example, a date, a time, and a vehicle movement schedule. The configuration of the movement schedule information is not limited to that illustrated in FIG. 10, and the movement schedule may be defined as a fixed range at predetermined time intervals (for example, intervals of one hour, four hours, forenoon, afternoon, or day).

FIG. 11 is a diagram illustrating a configuration of vehicle interior rental schedule information in the rental schedule DB D15. The vehicle interior rental schedule information records a vehicle interior rental schedule for each vehicle. Each record of the vehicle interior rental schedule information includes, for example, a date, a time, and a rental schedule. The configuration of the vehicle interior rental schedule information is not limited to that illustrated in FIG. 11, and a vehicle interior rental schedule may be defined as a fixed range at predetermined time intervals (for example, intervals of one hour, four hours, forenoon, afternoon, or day). The vehicle interior rental schedule information is an example of reserved schedule information indicating a rental reservation situation of vehicles which are supplied for a vehicle rental service. Accordingly, the rental schedule DB D15 functions as an example of a storage unit that stores reserved schedule information.

<Process Flow>

Figure 12:
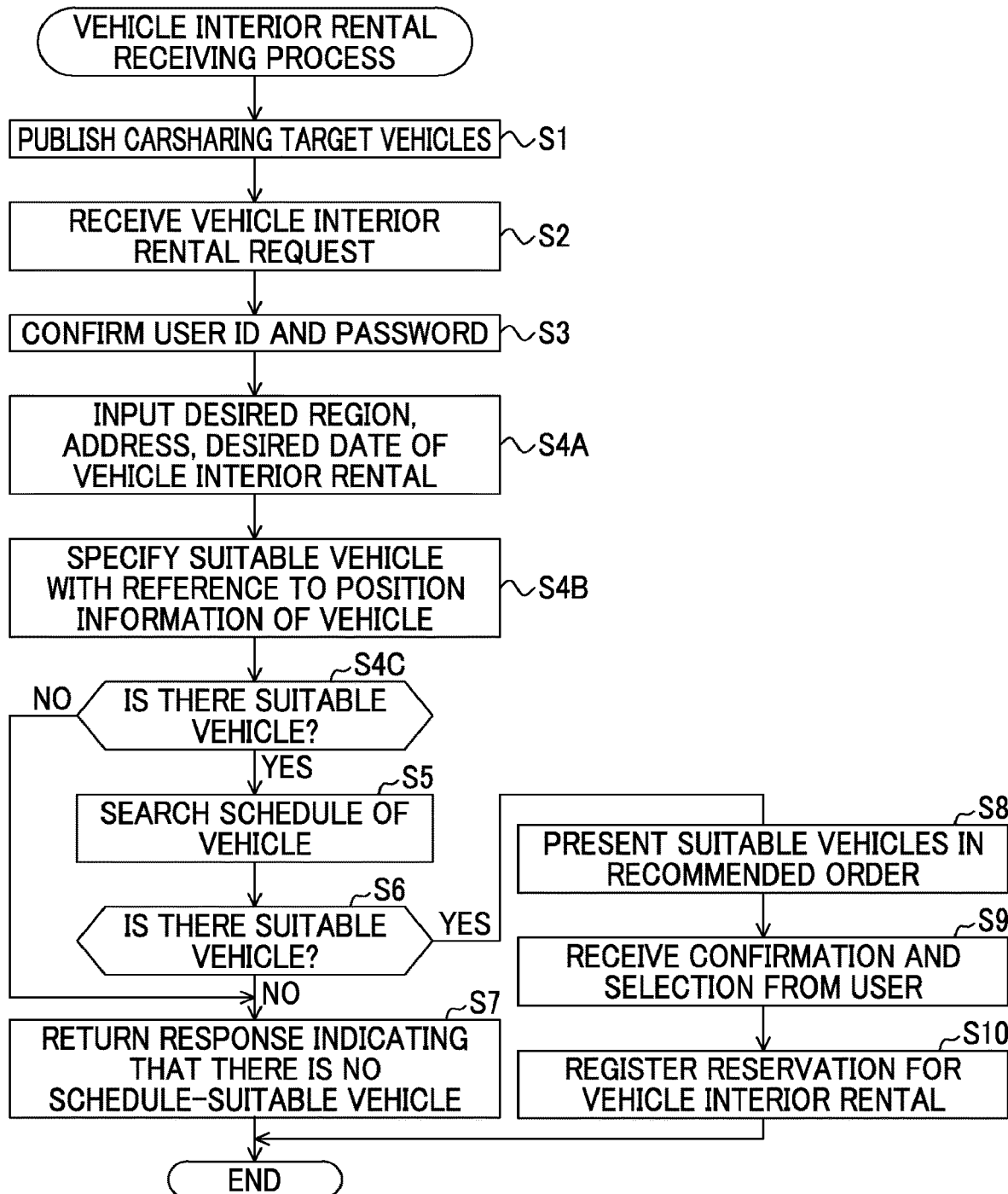
FIG. 12 is a flowchart illustrating a process routine which is performed by a management unit.

FIG. 12 is a flowchart illustrating a process flow which is performed by the reception unit F16 and the rental managing unit F15. In this process flow, the rental managing unit F15 publishes a list of carsharing target vehicles on the web (S1). On the web, for example, information of the vehicle registration table illustrated in FIG. 4 can be published as a list. The rental managing unit F15 may omit information for identifying an individual owner such as a registration number and an owner ID in publication on the web. The rental managing unit F15 may omit detailed information which can specify a person such as a house number in the parking lot address in publication on the web.

Then, the reception unit F16 receives a vehicle interior rental request from the user terminal 200 (S2). The vehicle interior rental request includes information of the user terminal 200 for specifying the user terminal 200 such as an address on the network N1 including a mobile phone network which is an address that is used for the rental managing unit F15 to return a response to the user terminal 200. The information of the user terminal 200 is an example of receiver terminal information. When the reception unit F16 receives the vehicle interior rental request, the rental managing unit F15 confirms a user ID and a password (S3). When confirmation of the user ID and the password has succeeded, the reception unit F16 receives an input of a vehicle interior rental application (S4A). In the vehicle interior rental application, a region in which a user desires rental of the interior of a vehicle, an address, date and time information, and the like are designated. The rental managing unit F15 specifies a suitable vehicle with reference to position information of vehicles (S4B). That is, the rental managing unit F15 searches records of vehicle IDs in which a parking lot address is included the region in which the user desires rental of the interior of a vehicle in the vehicle registration table of the vehicle DB D12. Alternatively, the rental managing unit F15 may search records of vehicle IDs in which a parking lot position (latitude and longitude) is included in the region in which rental of the interior of a vehicle is desired in the vehicle registration table of the vehicle DB D12 in S4A. The rental managing unit F15 may scan the records included in the vehicle registration table and may inquire of the onboard device 10A of the vehicle specified with the address or the parking lot position (latitude and longitude) about a current location via the onboard communication device. For example, the onboard device 10A of the vehicle acquires the current location from GPS signals and returns a response to the rental managing unit F15 via the onboard communication device. Accordingly, the rental managing unit F15 may narrow the vehicles based on the current location of the vehicle along with the parking lot address or the parking lot position (latitude and longitude) in the vehicle registration table. Then, the rental managing unit F15 determines whether there is a suitable vehicle in a region desired by the user (S4C). When there is not suitable vehicle, the rental managing unit F15 performs the process flow of S7. As exemplified in S4A, a use request includes information for specifying geographical conditions in which the vehicle rental service is received. The process of S4B is an example of referring to position information of vehicles which are supplied for the vehicle rental service.

When there is a suitable vehicle, the rental managing unit F15 performs a vehicle schedule searching process (S5). In this process, the rental managing unit F15 searches for a vehicle of which the interior can be used at the date and time desired by the user in the region desired by the user (referred to as a schedule-suitable vehicle). When there is a vehicle suitable for the vehicle interior rental application as the result of the vehicle schedule searching process (YES in S6), the rental managing unit F15 presents the schedule-suitable vehicle to the user terminal 200. The rental managing unit F15 performs the processes of S5 and S6 as an example of determining that a reservation for rental of the interior of a vehicle at a scheduled date and time at which the vehicle will not be used. When there is a plurality of schedule-suitable vehicles, the rental managing unit F15 presents a list of schedule-suitable vehicles in a recommended order to the user terminal 200 (S8). The processes of S4B, S4C, and S8 are an example of providing information on the vehicle satisfying the geographical conditions.

For example, the rental managing unit F15 may set the order of getting apart from the address designated by the vehicle interior rental application (the input in S4A) as the recommended order of schedule-suitable vehicles. By setting the order of getting apart from the address, convenience for the user is improved. The rental managing unit F15 may set the recommended order of schedule-suitable vehicles to give priority to a vehicle of an owner having agreed to provision of the movement schedule. The rental managing unit F15 may sort vehicles in the order of owners from the highest number of incentive points in the owner evaluation table (see FIG. 8) and set the sorted order as the recommended order of schedule-suitable vehicles. The rental managing unit F15 may weight and combine these conditions, add the weight when a plurality of conditions are satisfied, and set the order of added weights from the highest weighted as the recommended order. This is because it is possible to more surely predict implementation of rental of a vehicle of an owner having agreed to provision of the movement schedule or a vehicle of an owner having a high number of incentive points in comparison with vehicles of owners not having agreed or vehicles of owners having low incentive points. The process of S8 is an example of a process of providing information on vehicles in a recommended order in which a vehicle of which provision of movement schedule information is permitted or a vehicle of an owner having a high number of incentive points has priority when there is a plurality of vehicles which satisfy the desired rental schedule.

Then, the rental managing unit F15 receives confirmation of a user via the user terminal 200. When there is a plurality of schedule-suitable vehicle s, the rental managing unit F15 promotes the user to select a vehicle via the user terminal 200 and receives the selection (S9). Then, the rental managing unit F15 sets a reservation for rental of the interior of the corresponding vehicle in the rental schedule DB D15 after confirmation and selection by the user (S10). Accordingly, when there is a vehicle suitable for the desired vehicle interior rental date, a reservation for rental of the interior of the vehicle is set in the rental schedule DB D15 and a user can use the interior of the vehicle in accordance with the reservation. On the other hand, when there is no vehicle suitable for the vehicle interior rental application as the result of the vehicle schedule searching process (NO in S4C or S6), the rental managing unit F15 returns a response indicating that there is no schedule-suitable vehicle to the user terminal 200 (S7).

Figure 13:
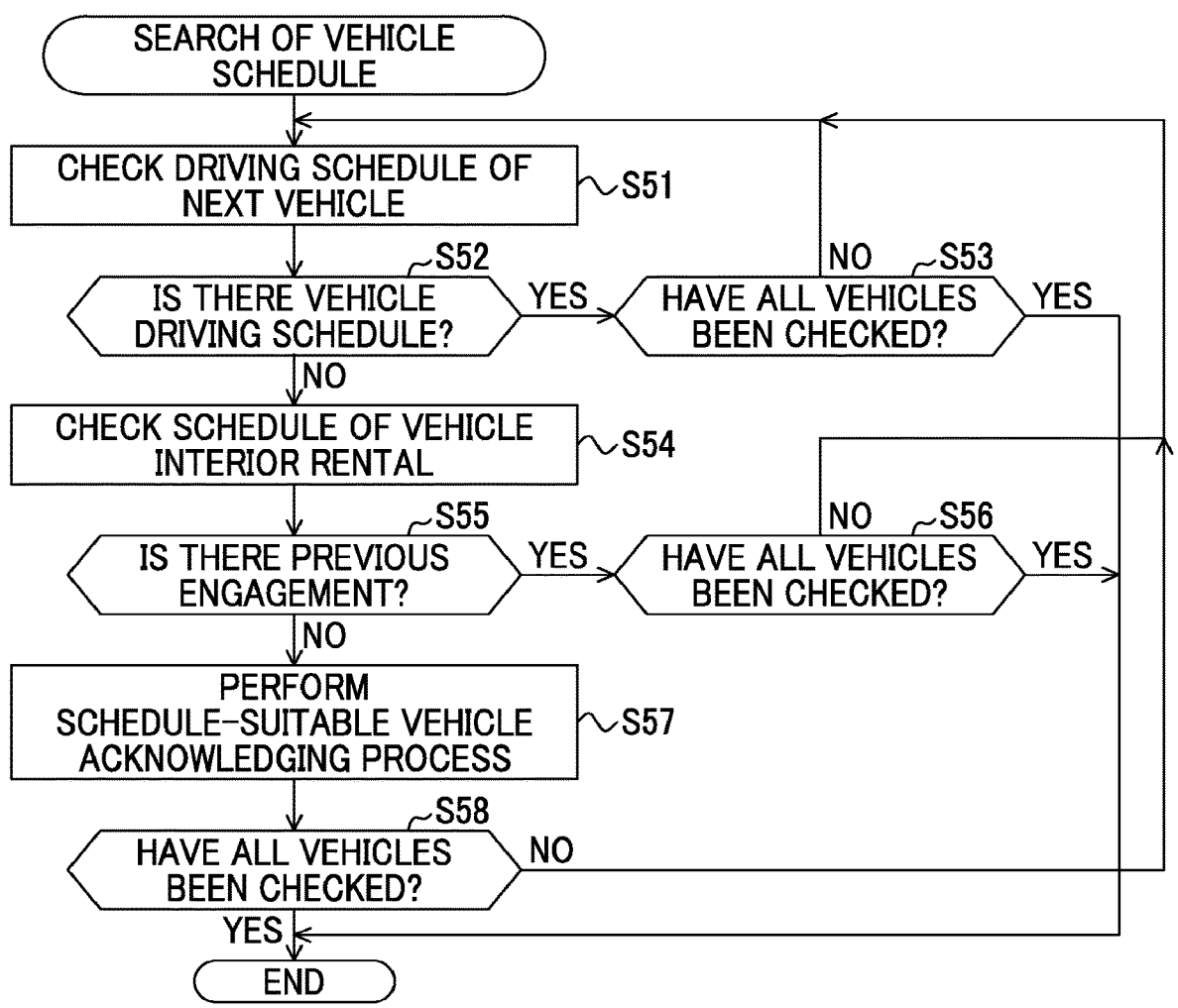
FIG. 13 is a flowchart illustrating a detailed flow of a vehicle schedule searching process.

FIG. 13 is a flowchart illustrating details of the vehicle schedule searching process (S5 in FIG. 12). In this process, the rental managing unit F15 sequentially selects available vehicles (which are specified in S4B) in the region input with the vehicle interior rental application (S4A) and sequentially checks the movement schedule of the selected vehicle (S51). Then, when the vehicle is scheduled to be driven at the desired use date and time (YES in S52), the rental managing unit F15 determines whether all the available vehicles in the region input with the vehicle interior rental application have been checked. When all the vehicles have not been yet checked (NO in S53), the rental managing unit F15 returns the process flow to S51. On the other hand, when all the vehicles have been checked (YES in S53), the rental managing unit F15 ends the process flow.

On the other hand, when the vehicle is not scheduled to be driven at the desired use date and time (NO in S52), the rental managing unit F15 checks the interior rental schedule of the vehicle (S54). When there is a previous engagement for the vehicle (YES in S55), the rental managing unit F15 determines whether all the available vehicles in the region have been checked (S56). When all the vehicles have not been yet checked (NO in S56), the rental managing unit F15 returns the process flow to S51. On the other hand, when all the vehicles have been checked (YES in S56), the rental managing unit F15 ends the process flow.

When it is determined in S55 that there is no previous engagement for the vehicle (NO in S55), the rental managing unit F15 performs a schedule-suitable vehicle acknowledging process (S57). The schedule-suitable vehicle acknowledging process is, for example, a process of adding vehicle IDs of schedule-suitable vehicles to a list for work. Then, the rental managing unit F15 determines whether all the vehicles have been checked (S58). When all the vehicles have not been yet checked (NO in S58), the rental managing unit F15 returns the process flow to S51. On the other hand, when all the vehicles have been checked (YES in S58), the rental managing unit F15 ends the process flow. When the process flow ends, the rental managing unit F15 can perform the determination of S6 in FIG. 12 based on the number of suitable vehicles in a work list.

Figure 14:
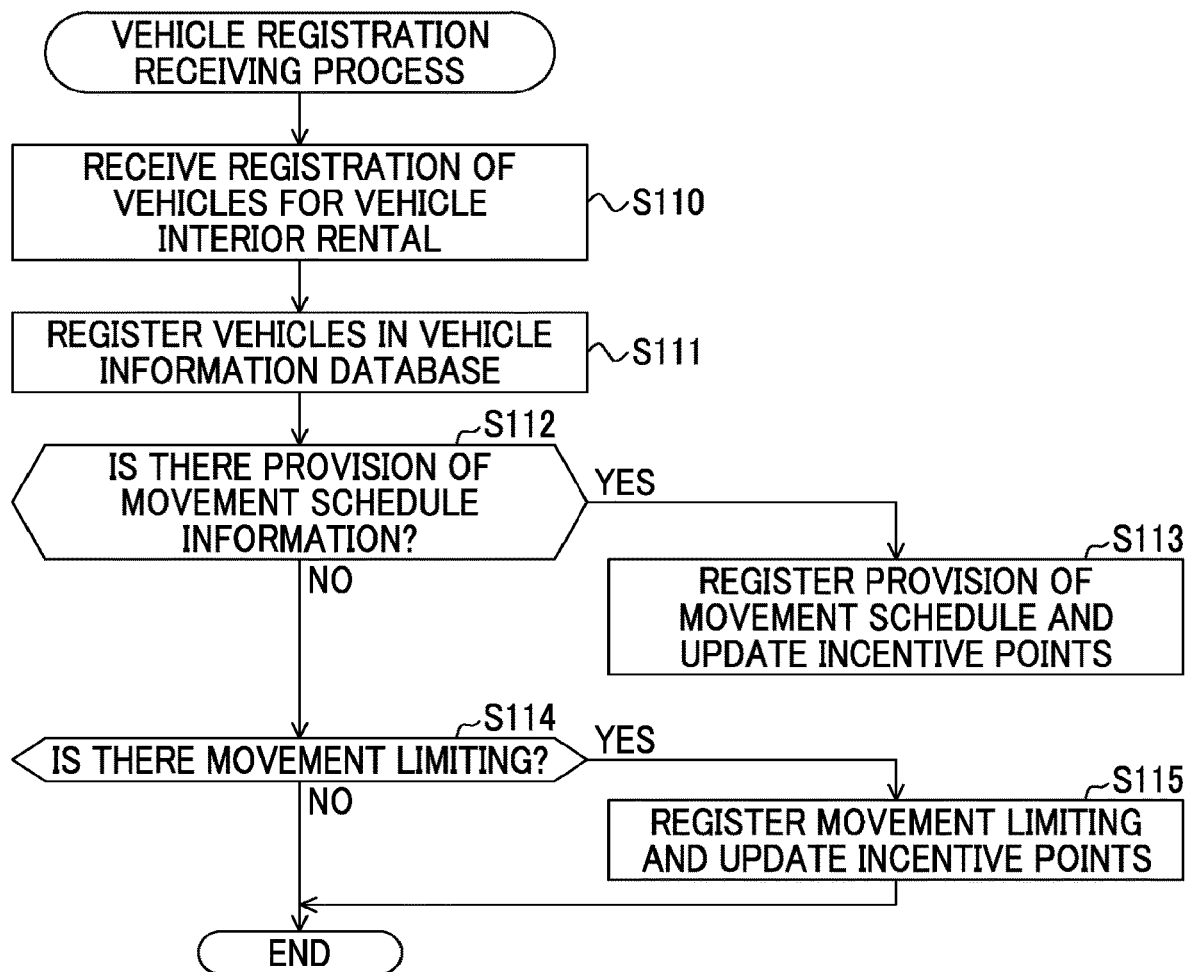
FIG. 14 is a flowchart illustrating a flow of a vehicle registration receiving process.

FIG. 14 is a flowchart illustrating the vehicle registration receiving process which is performed by the vehicle managing unit F13. In the vehicle registration receiving process, the vehicle managing unit F13 first receives information of an interior-rental vehicle from the owner terminal 210 (S110). Then, the vehicle managing unit F13 registers the received information in the vehicle registration table in the vehicle DB D12.

Then, the vehicle managing unit F13 promotes the owner terminal 210 to input information and checks whether movement schedule information is to be provided (S112). When the movement schedule information of the vehicle is to be provided, the vehicle managing unit F13 registers an intention of the owner of the vehicle to provide the movement schedule information in the owner registration table and adds incentive points to the monthly incentive points of the owner (S113). The addition method is not particularly limited and, for example, predetermined points may be added when the intention to provide the movement schedule information is displayed. For example, when the intention to provide the movement schedule information is maintained, for example, predetermined points may be added for the owner for each month. The process of S113 is an example of a process of an incentive offering unit that offers a predetermined incentive to the owner of the vehicle of which provision of the movement schedule information is permitted.

Then, the vehicle managing unit F13 checks whether the owner agrees to movement liming via the owner terminal 210 (S114). The movement limiting means that a movement range of a vehicle to be registered is limited to a specific region. When the owner agrees to the movement limiting, the vehicle managing unit F13 promotes the owner terminal 210 to input information, receives an input of movement limiting conditions, and registers the movement limiting conditions. An example of the movement limiting conditions is a condition that a moving region of a vehicle is limited to a predetermined area. The movement limiting conditions may include designation of a time period and designation of days. An example thereof is a condition that the vehicle does not move from a home parking lot on weekdays. When the owner agrees to the movement limiting, the vehicle managing unit F13 sets the movement limiting conditions in the vehicle registration table and adds points to the monthly incentive points of the owner (S115) The addition method is not particularly limited and, for example, predetermined points may be added when the movement limiting is registered. For example, when the movement limiting is maintained, predetermined points may be added for the owner periodically, for example, every month. The process of S115 is an example of a process of offering a predetermined incentive to the owner having agreed to the movement limiting of the vehicle.

Figure 15:
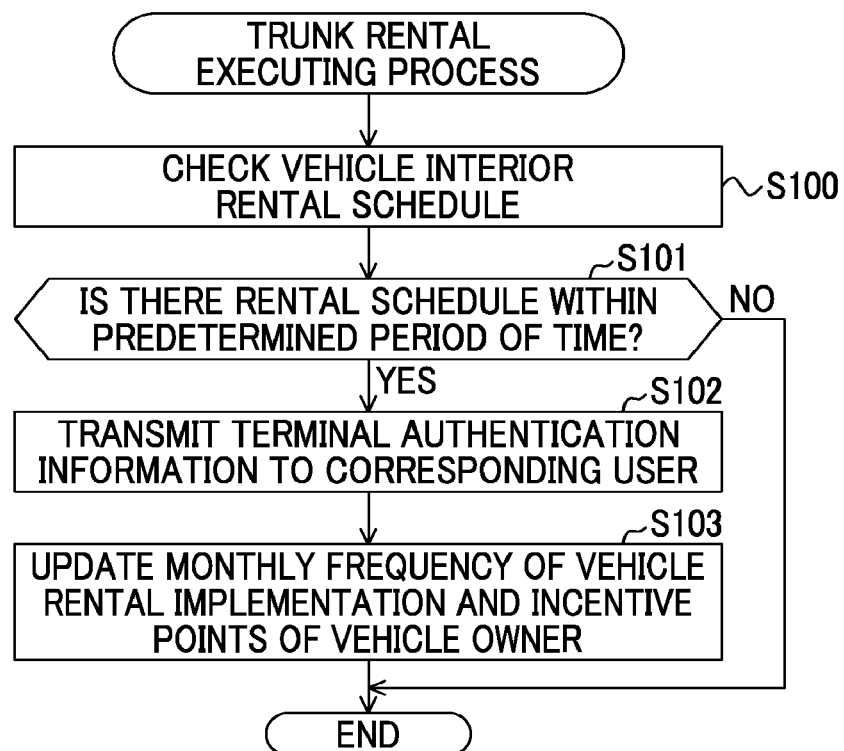
FIG. 15 is a flowchart illustrating a flow of a vehicle renting process.

FIG. 15 is a flowchart illustrating a vehicle renting process which is performed by the rental managing unit F15. This process is performed at predetermined intervals (for example, at predetermined time intervals). In this process, the rental managing unit F15 checks the vehicle interior rental schedule (S100). It is determined whether there is a rental schedule which is within a predetermined time (S101). When the rental schedule is within the predetermined time, the rental managing unit F15 transmits information for identifying a reserved vehicle and terminal authentication information corresponding to device authentication information in the key unit 100 mounted in the reserved vehicle to the user terminal 200 of the user (S102). Then, the rental managing unit F15 updates a monthly frequency of vehicle interior rental implementation and incentive points of the owner of the vehicle (S103). The monthly frequency of vehicle interior rental implementation is an example of a rate at which rental of the interior of a vehicle according to the reservation schedule information can be implemented. Accordingly, the rental managing unit F15 can determine the incentive points which are offered to the owner of the reserved vehicle based on the rate at which rental of the interior of a vehicle of which rental of the interior has been reserved according to the reservation schedule information could be implemented in the process of S103.

The user terminal 200 receives terminal authentication information which is temporarily available, perform authentication with the key unit 100, and can temporarily unlock the interior of the vehicle. Examples of information for identifying a vehicle include a registration number, parking lot address, a parking lot position, a vehicle manufacturer, a popular name, and a color. A user finds out the corresponding information from the information for identifying a vehicle, performs authentication between the user terminal 200 and the key unit 100, and can temporarily use the interior of the vehicle.

Advantages of First Embodiment

As described above, with the information system according to the first embodiment, it is determined whether there is a vehicle suitable for a vehicle interior rental request from a user who desires rental of the interior of a vehicle from vehicles which are supplied for the carsharing service in consideration of movement schedules of vehicles. Accordingly, it is possible to satisfactorily determine a vehicle interior rental schedule in comparison with a case in which it is determined whether there is a vehicle suitable for the vehicle interior rental request based on only the vehicle rental schedule information. It is also possible to curb occurrence of an event in which implementation of rental of the interior of a vehicle is hindered due to the movement schedule of an owner of a vehicle. Accordingly, for example, when the interior of a vehicle is designated as a delivery (or pickup) destination of home delivery, it is possible to decrease a likelihood that a scheduled receiver (or a pickup user) of baggage will not be able to receive baggage of the interior of the vehicle due to movement of the vehicle.

In the information system according to the first embodiment, the schedule information acquiring unit F14 can extract a movement schedule of a vehicle from an activity schedule of an owner of the vehicle and set the movement schedule. Accordingly, by setting an activity schedule including "drive," "transportation," "automatic driving," "autonomous driving command," and "unmanned driving" in an activity schedule management tool which is generally used, an owner of a vehicle can provide determination materials for determination of whether the vehicle of the owner is to be used in the vehicle schedule searching process which is performed by the rental managing unit F15 without performing a setting operation on the movement schedule DB D15. Accordingly, a vehicle owner can reduce occurrence of new labor for supplying a vehicle to a carsharing service and can provide a movement schedule of the vehicle to the rental managing unit F15.

In the process flow illustrated in FIG. 15, when there is a rental schedule in which the rental date and time is within a predetermined time, the rental managing unit F15 confirms the vehicle interior rental schedule at predetermined intervals and transmits information for identifying a reserved vehicle and terminal authentication information corresponding to device authentication information in the key unit 100 of the reserved vehicle to the corresponding user. However, instead of this process, the rental managing unit F15 may receive a request for transmission of terminal authentication information which can be used for authentication in the key unit 100 and transmit the terminal authentication information which can be used for authentication in the key unit 100 to the requesting user when the rental schedule is within a predetermined time.

In the first embodiment, when an owner of a vehicle agrees to provision of a movement schedule of the vehicle, incentive points are offered to the owner. Accordingly, the information system can promote an owner of a vehicle to provide a movement schedule of the vehicle and provide a stable carsharing service. In the first embodiment, when an owner of a vehicle maintains an intention to provide a movement schedule of the vehicle, incentive points may be offered to the owner for each month. Through this service, an owner of a vehicle can maintain an intention to provide a movement schedule of the vehicle and the carsharing system 1 according to the first embodiment can accurately collect movement schedules.

According to the first embodiment, when a plurality of schedule-suitable vehicles has been detected, the rental managing unit F15 prepares a list of vehicles in the recommended order in which a vehicle closer to a desired address of a user, a vehicle of which a movement schedule is provided, a vehicle of which an owner has a high incentive point, or the like has priority and presents the list to a user. The rental managing unit F15 can enhance convenience for a user in the vehicle interior rental service. That is, by providing a vehicle closest to a desired address of a user, convenience for the user is improved. By giving priority a vehicle of which a movement schedule is provided, a vehicle of which an owner has a high incentive point, or the like, it is possible to preferentially recommend a vehicle of a reliable owner or an owner having many actual results and to enhance a likelihood that the vehicle interior rental service will be provided.

According to the first embodiment, when an owner of a vehicle agrees to movement limiting of the vehicle, incentive points are offered to the owner. When a vehicle is subjected to the movement limiting, a user can more satisfactorily use the interior of a vehicle in the carsharing service. In the first embodiment, when the movement limiting of a vehicle is maintained, incentive points may be offered to the owner for each month. Through this service, an owner of a vehicle can maintain an intention to limit movement of the vehicle and a user can more satisfactorily use the interior of the vehicle.

According to the first embodiment, when the interior of a vehicle is reserved by another user and the interior of the vehicle is used as scheduled, the incentive points of the corresponding owner are increased. Accordingly, in the carsharing service using the information system, an owner of a vehicle can be expected to behave such that the interior of the vehicle is used as scheduled as much as possible. For example, an owner of a vehicle takes consideration such that rental of the interior of the vehicle in the carsharing service is not affected by change of the owner's activity schedule and it is thus possible to provide a stable carsharing service.

Second Embodiment

An information system according to a second embodiment will be described below with reference to FIGS. 16A to 18. In the first embodiment, a carsharing service in which a reservation for rental of the interior of a vehicle is carried out for a user in consideration of a movement schedule of an owner of a vehicle and the rental is carried out has been described above. In the second embodiment, a processing example in which the interior of a vehicle which is rented in the first embodiment is used as a delivery destination of home delivery or online shopping will be described. Accordingly, in the second embodiment, a user terminal 200 is described as a deliverer terminal 220 of a home delivery company and a receiver terminal 230 which receives baggage. In the information system according to the second embodiment, a configuration other than a configuration associated with processes using the interior of a vehicle as a delivery destination of home delivery or online shopping is the same as in the first embodiment. Therefore, the same elements in the second embodiment as in the first embodiment will be referred to by the same reference signs and description thereof will not be repeated. At least the configurations illustrated in FIGS. 1 and 2 are also applied to the second embodiment. At least the processes of the rental managing unit F15 illustrated in FIGS. 12 to 14 and the vehicle registering process of the vehicle managing unit F13 are also performed in the second embodiment.

Figure 16A:
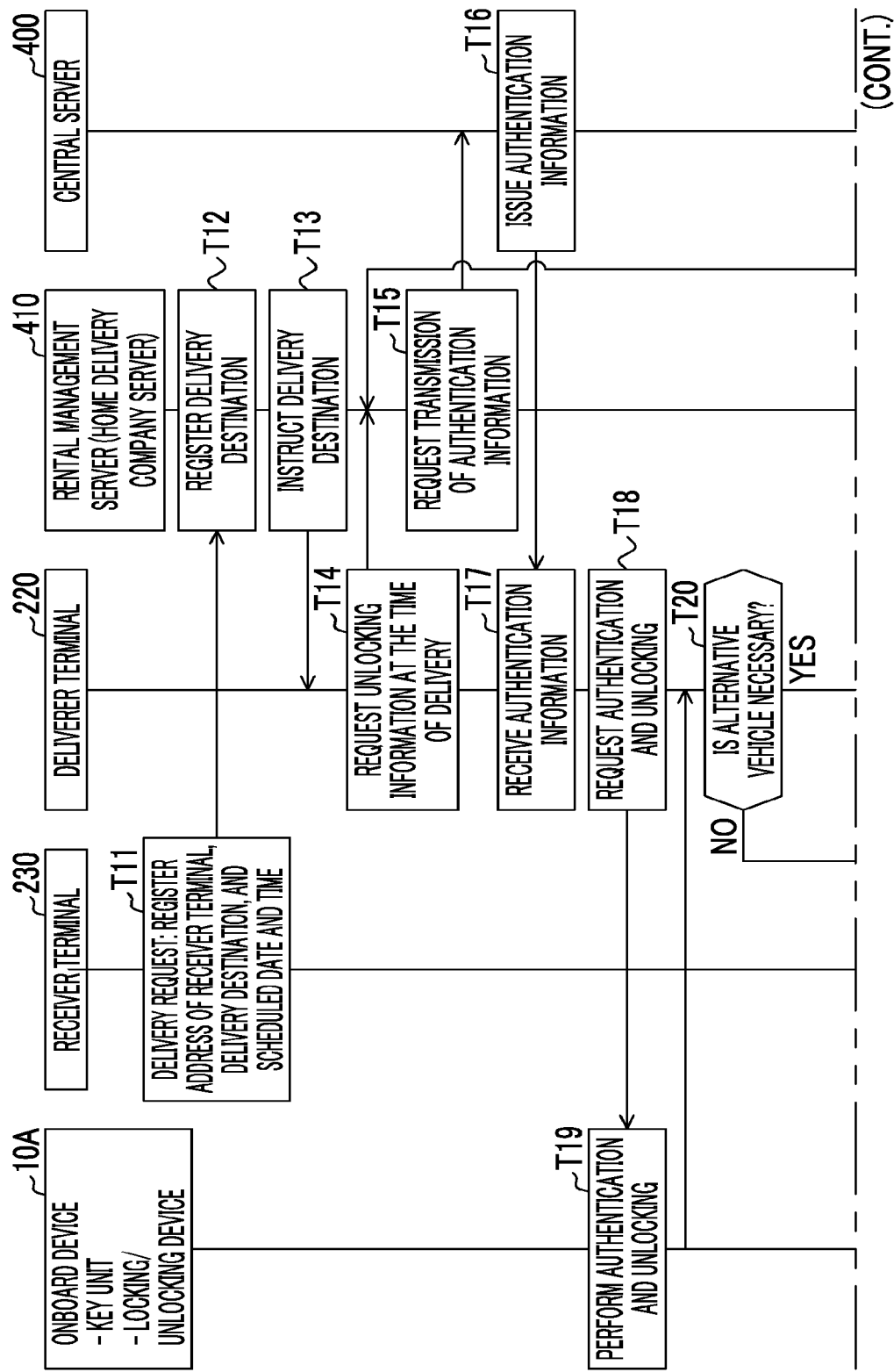
FIG. 16A is a former sequence diagram of an information system according to a second embodiment.

FIGS. 16A and 16B are sequence charts of the information system according to the second embodiment. FIGS. 16A and 16B illustrate reception and transmission of information between an onboard device 10A mounted in a vehicle 10, a receiver terminal 230 of a receiver who receives home delivery, a deliverer terminal 220 of a home delivery company, a rental management server 410, and a central server 400. Here, the receiver is a receiver serving as a delivery destination of home delivery and is designated as a delivery destination, for example, by notification of a home delivery schedule from the home delivery company. The receiver may be a purchaser of a product in online shopping or the like.

The rental management server 410 is a server that manages a rental schedule or the like in a carsharing service, similarly to the first embodiment. In the following embodiment, it is assumed that the rental management server 410 is unified with a server of a home delivery service provider or an online shopping service provider. Here, a business server that manages a home delivery service provider or an online shopping service provider may be provided separately from the rental management server 410 that manages a rental schedule or the like in the carsharing service. That is, a business server that supports various businesses and the rental management server 410 and the central server 400 can receive and transmit information via a network N1 and provide a service in cooperation. On the other hand, the business server, the rental management server 410, and the central server 400 may be unified as a single body.

In a process flow of the information system, for example, the receiver terminal 230 sets a delivery request including a communication address of the receiver terminal 230 on the network N1, a delivery destination of a purchased product, and a scheduled (desired) delivery date and time in an online shopping service in the rental management server 410. The receiver terminal 230 may confirm a delivery destination address and a scheduled (desired) date and time of a delivery object from the communication address of the receiver terminal 230 on the network N1, for example, in response to notification of delivery date and time confirmation from a home delivery company and set the confirmation result in the rental management server 410 (T11). That is, in the second embodiment, a scheduled delivery date and time at which delivery of baggage is performed is described as an example of a desired rental schedule in which a vehicle is used. The scheduled delivery date and time is an example of a scheduled transportation date and time.

Then, the rental management server 410 receives an input from the receiver terminal 230 and registers the delivery destination (T12). For example, when the interior of a vehicle located near a delivery destination address of a product purchased in online shopping is designated as a delivery destination of online shopping by the receiver terminal 230, the rental management server 410 searches for available schedules of vehicles which are supplied for the carsharing service in the same order as in the rental managing unit F15 described in the first embodiment, and presents available vehicles to the receiver terminal 230.

When the business server that manages an online shopping service and the rental management server 410 are separate from each other, the business server can request the rental management server 410 to search for available schedules of vehicles and acquire the search result from the rental management server 410. By causing a receiver to select one in a list of vehicles acquired as the search result using the receiver terminal 230, a vehicle which is available at the scheduled delivery date and time of online shopping is selected and is registered as a delivery destination, for example, in the business server of a home delivery company. That is, the rental management server 410 can be said to select a vehicle which is available at a scheduled transportation date and time and to set a reservation for use of the selected vehicle at the scheduled delivery date and time in the reservation schedule information.

In the process of T12, as described above, when the receiver terminal 230 has been notified of a request for confirmation of a delivery date and time from the home delivery company using an electronic mail or the like, a request for change of the delivery destination to the interior of a vehicle located around the delivery destination address may be input from the receiver terminal 230. When the delivery destination is changed to the interior of a vehicle, the rental management server 410 searches for available schedules of vehicles which are supplied for the carsharing service in the same sequence as performed by the rental managing unit F15 which is described in the first embodiment and presents available vehicles to the receiver terminal 230. When the business server that manages the home delivery service and the rental management server 410 are separate from each other, the business server can request the rental management server 410 to search for available schedules of vehicles and acquire the search result from the rental management server 410. By causing the receiver to select vehicles in the list of vehicles acquired as the search result using the receiver terminal 230, vehicles which are available at the scheduled delivery date and time are selected and registered as a delivery destination in the business server of the home delivery company.

When the interior of a vehicle is registered as a delivery destination, the rental management server 410 notifies the deliverer terminal 220 of information indicating the delivery destination (T13). Accordingly, the rental management server 410 can control transmission of information for identifying the selected vehicle to a terminal of a service user associated with transportation of baggage. When the business server that manages the home delivery service and the rental management server 410 are separate from each other, the rental management server 410 can notify the deliverer terminal 220 of information on the delivery destination via the business server for a home delivery service. The information indicating a delivery destination includes identification information for specifying a delivery object, an address and a name of a receiver, and information for specifying the delivery object.

When the scheduled delivery date and time is within a predetermined time (for example, within one day), the deliverer terminal 220 requests the rental management server 410 to transmit terminal authentication information for unlocking a gate or door to the interior of a vehicle at the time of delivery (T14). When the terminal authentication information is requested from the deliverer terminal 220, the rental management server 410 designates an owner ID, a vehicle ID, and a password of a vehicle set as the delivery destination and requests the central server 400 to transmit the terminal authentication information (T15). Similarly to the first embodiment, the terminal authentication information is information which corresponds to device authentication information stored in the key unit 100 and is used for authentication in the key unit 100.

Then, the central server 400 issues terminal authentication information which is used for authentication in the key unit 100 and which is registered in correlation with the designated owner ID and vehicle ID (T16). The deliverer terminal 220 receives the terminal authentication information which is a one-time key via the rental management server 410 or directly from the central server 400 (T17). Accordingly, the rental management server 410 can control transmission of access permission information for permitting an access to the interior of the selected vehicle. Transmission of the terminal authentication information may be performed by causing the deliverer terminal 220 to request the rental management server 410 or the central server 400 to transmit the terminal authentication information, for example, when a deliverer arrives as a parking position of the vehicle as the delivery destination. Transmission of the terminal authentication information may be performed, for example, at the same time as notification of information indicating the delivery destination in T13. That is, information indicating a delivery destination and terminal authentication information used for authentication in the key unit 100 of the delivery destination may be transmitted to the deliverer terminal 220 at different times or may be transmitted to the deliverer terminal at the same time.

The deliverer moves to the parking lot address and the parking lot position of the vehicle designated as the delivery destination using a car navigation function or the like and specifies a vehicle based on a registration number, a vehicle manufacturer, a popular name (a vehicle model) of the vehicle, a color, or the like. Then, the deliverer terminal 220 requests the key unit 100 mounted in the vehicle 10 designated as the delivery destination for authentication based on the received terminal authentication information in response to the deliverer's operation and performs an unlocking operation (T18). Then, the key unit 100 of the onboard device 10A performs the requested authentication and unlocks a gate or door to the interior of the vehicle 10 in accordance with an unlocking request when the authentication has succeeded.

When the gate or door to the interior of the vehicle 10 is unlocked, the deliverer opens the gate or door to the interior of the vehicle. When a delivery object can be received in the interior of the vehicle after the gate or door to the interior of the vehicle has been opened, the deliverer completes the delivery. The deliverer terminal 220 transmits delivery completion notification to the rental management server 410 in response to the deliver's operation (T23). However, when a volume or size of the delivery object exceeds the allowable capacity of the interior of the vehicle (YES in T20), an alternative vehicle is necessary. An example of such a case is a case in which a plurality of pieces of baggage is already stored in the interior of the vehicle and the residual capacity of the interior of the vehicle is less than the volume of the delivery object. Therefore, when the capacity of the interior of the vehicle is insufficient and thus an alternative vehicle is necessary, the deliverer terminal 220 requests the rental management server 410 for an alternative vehicle in response to the deliverer's operation (T21). The rental management server 410 searches for another alternative vehicle (T22). When another alternative vehicle is searched for, the rental management server 410 returns the process flow to T15 and request transmission of terminal authentication information used for authentication of the alternative vehicle.

Although not illustrated in FIGS. 16A and 16B, the rental management server 410 transmits the notification thereof to the deliverer terminal 220 and ends the process flow when another alternative vehicle has not been searched for in the process of T22. When the notification indicating that another alternative vehicle has not been searched for is received from the rental management server 410, the deliverer terminal 220 presents the notification to the deliverer using a display or the like. Then, the deliverer gives up completion of the delivery into the interior of a vehicle on that day and returns with the delivery object.

When the deliverer terminal 220 transmits the delivery completion notification to the rental management server 410 in T23, the deliverer terminal 220 invalidates the terminal authentication information, for example, by deleting the terminal authentication information stored in the deliverer terminal 220 (T24). After the delivery completion notification has been received, the rental management server 410 requests the central server 400 to issue terminal authentication information as a one-time key for a receiver when the receiver of baggage is not an owner of the vehicle (T25). When the central server 400 issues the terminal authentication information (T26), the rental management server 410 transmits a delivery completion notification along with the terminal authentication information issued from the central server to the receiver terminal 230 (T27).

Regarding issuance of the terminal authentication information, for example, the rental management server 410 may issue the terminal authentication information to a receiver of the baggage at the time at which the rental management server 410 registers the interior of a vehicle as a delivery destination and transmits information indicating the delivery destination to the deliverer terminal 220 in the process of T13, that is, at the time at which the interior of the vehicle is reserved. The time at which the interior of the vehicle is reserved is, for example, a time at which a reservation for rental of the interior of the vehicle is registered in FIG. 12 according to the first embodiment (at the time of performing S10). Accordingly, the rental management server 410 as a managing unit can be said to perform a process of giving a permission for locking and unlocking to a scheduled rental user using electronic information at the scheduled use date and time with settlement of a use reservation through processes of T13 and T26. The receiver of baggage is an example of the scheduled rental user and issuance of terminal authentication information for the receiver of baggage is an example of the permission for locking and unlocking.

A number on a mobile phone network or an address on the network as an address of the receiver terminal 230 is an example of an address of the terminal. The delivery completion notification includes information for identifying a vehicle as a delivery destination. When the receiver of baggage is an owner of a vehicle, terminal authentication information without a validity term has been transmitted to the owner terminal 210 and thus the processes of T25 and T26 are skipped. Accordingly, the processes of T25 to T27 include determination of that the terminal authentication information has been transmitted and is an example of a process in which the rental management server 410 controls transmission of information for identifying the selected vehicle and access permission information for permitting an access to the interior of the selected vehicle to the terminal of the receiver.

When the terminal authentication information is received (T28), the receiver terminal 230 requests authentication in the key unit 100 mounted in the vehicle 10 which is designated as a delivery destination using the received terminal authentication information and performs an unlocking operation (T29). When the receiver is an owner of the vehicle, the authentication can be performed using terminal authentication information stored in the owner terminal 210 without a validity term. Then, the key unit 100 of the onboard device 10A performs the authentication and unlocks the gate or door to the interior of the vehicle 10 in response to an unlocking request when the authentication has succeeded (T30).

Then, when the receiver acquires baggage from the interior of the vehicle and close the gate or door to the interior of the vehicle, the key unit 100 of the onboard device 10A transmits an instruction to invalidate the terminal authentication information to the receiver terminal 230 (T31), and the receiver terminal 230 invalidates the terminal authentication information by deleting an electronic key or the like (T32). The receiver terminal 230 may promote the receiver to confirm whether baggage has been acquired, and invalidate the terminal authentication information when an input indicating that the receiver has received baggage has been received. When the receiver is an owner of the vehicle, the process of invalidating the terminal authentication information stored without a validity term in the owner terminal 210 is not performed.

The receiver terminal 230 transmits a reception notification to the rental management server 410 (T33), and the rental management server 410 notifies the central server 400 that the electronic key issued to the receiver terminal 230 has been invalidated (T34). Then, the rental management server 410 updates the incentive points of the owner of the vehicle. T35 is an example of a process of determining the incentive points offered to the owner of the reserved vehicle based on a rate of vehicles of which the rental could be performed in accordance with the reservation schedule information to vehicles of which the rental is reserved in the reservation schedule information.

Figure 17:
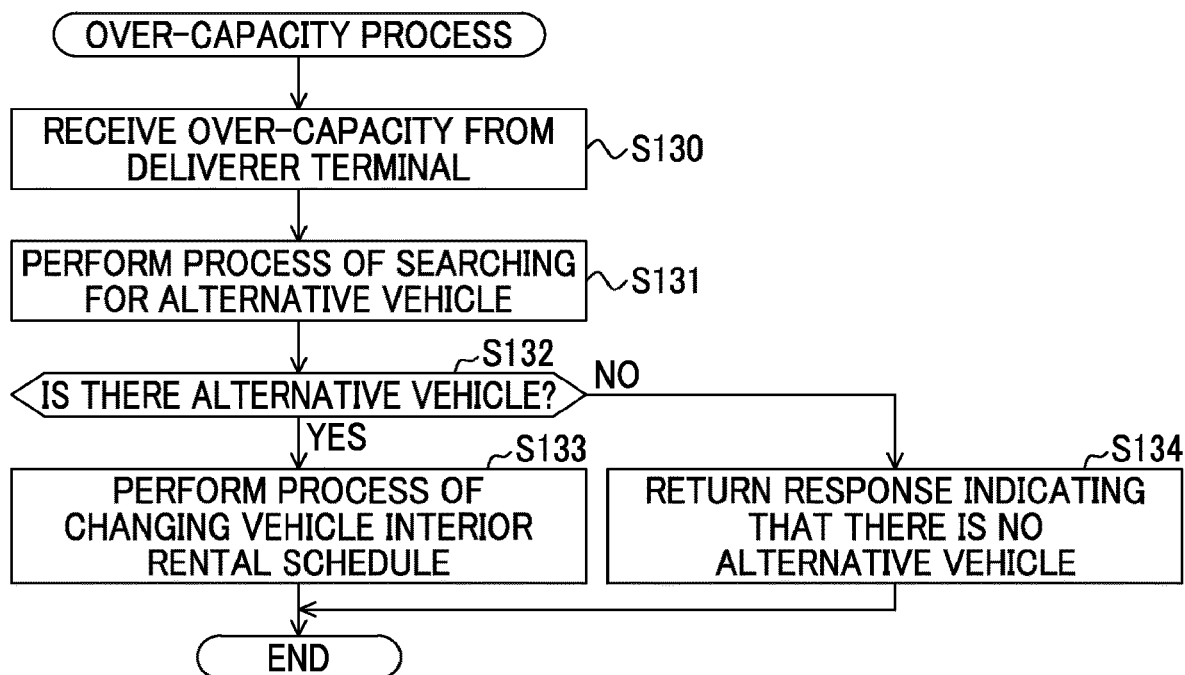
FIG. 17 is a flowchart illustrating a flow of an over-capacity processing process.

FIG. 17 is a flowchart illustrating a process flow of over-capacity processing which is performed by the reception unit F16 and the rental managing unit F15 of the rental management server 410. In this process flow, the rental management server 410 receives a notification indicating that the interior of the vehicle is over the capacity from the deliverer terminal 220 (S130). The notification indicating an over-capacity may designate a size, a capacity, or the like required for accommodation of a delivery object.

Then, the rental management server 410 searches for an alternative vehicle from other vehicles belonging to the same cluster (S131). For example, capacities of the interiors of vehicles may be defined in the vehicle registration table (FIG. 4). The size of the interior of a vehicle may be defined in a master database which is not illustrated for each type of vehicle (such as a popular name or a model). When the notification indicting an over-capacity includes a size, a capacity, or the like required for accommodation of the delivery object and the capacity of the interior of a vehicle can be acquired from the vehicle registration table or the master database which is not illustrated, the rental management server 410 can select a vehicle having an internal space equal to or larger than the designated capacity. When the capacity of the internal space of a vehicle cannot be acquired, the rental management server 410 can simply search other vehicles belonging to the same cluster as the vehicle having the over-capacity with reference to the cluster member table. Accordingly, when the notification indicating that an over-capacity in which baggage to be transported cannot be accommodated in the interior of the vehicle as the transportation destination has occurred is received, the rental management server 410 performs an example of a process of determining one vehicle of the vehicles belonging to the same group as the vehicle which is a transportation destination as an alternative vehicle through the processes of S130 and S131.

When an alternative vehicle has been searched for (YES in S132), the rental management server 410 performs a process of changing a vehicle interior rental schedule (S133). More specifically, the rental management server 410 reserves the interior of the alternative vehicle at the delivery date and time in the vehicle interior rental schedule information and transmits information for identifying the alternative vehicle and terminal authentication information used for authentication in the key unit 100 of the alternative vehicle as a one-time key to the deliverer terminal 220 and the receiver terminal 230. Here, the information for identifying the alternative vehicle includes a registration number, a parking lot address, a parking lot position, a vehicle manufacturer, a popular name, and a color similarly to the first embodiment. The terminal authentication information may be transmitted to the receiver terminal 230 after delivery has been completed. Accordingly, through the process of S133, the rental management server 410 performs an example of a process of controlling transmission of information for identifying the selected alternative vehicle and access permission information for permitting an access to the interior of the alternative vehicle to a terminal of a service user.

On the other hand, when an alternative vehicle has not been searched for (NO in S132), the rental management server 410 returns a response indicating that there is no alternative vehicle to the deliverer terminal 220 (S134). When the response indicating that there is no alternative vehicle is received by the deliverer terminal 220, the deliverer gives up delivery to the interior of a vehicle on that day and, for example, returns with the delivery object.

In FIGS. 16A, 16B, and 17, a process of causing the rental management server 410 to search for an alternative vehicle in response to a request for an alternative vehicle from the deliverer terminal 220 when the capacity of a vehicle as a delivery destination is insufficient is illustrated. Another process example of requesting an alternative vehicle will be described now.

Figure 18:
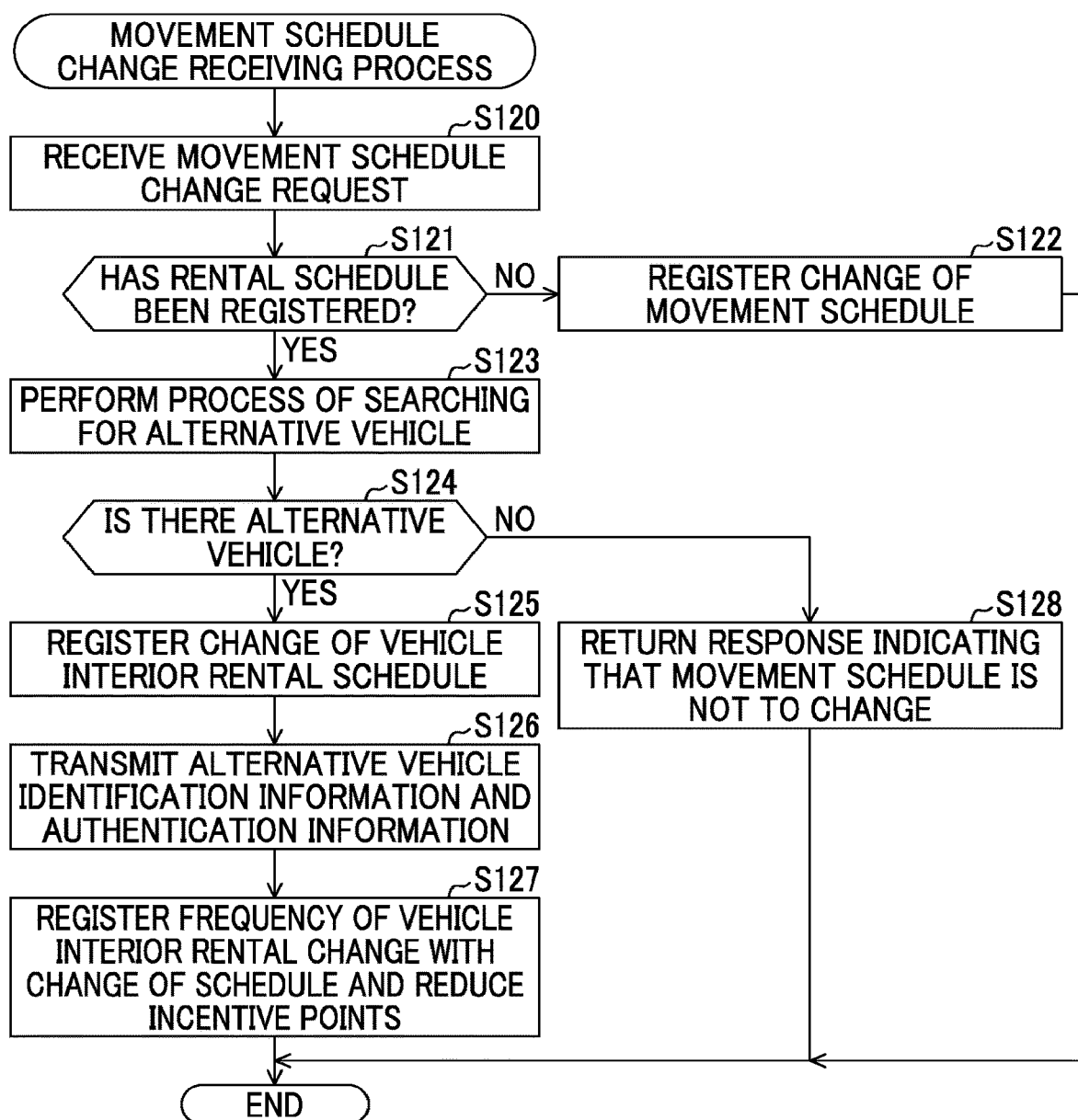
FIG. 18 is a flowchart illustrating a flow of processes which are performed by a rental management server having received a notification due to change of a movement schedule.

FIG. 18 is a flowchart illustrating a process flow which is performed by the rental management server 410 having received a notification due to change of a movement schedule from the owner terminal 210. This process flow is started when the rental management server 410 receives a notification indicating change of a movement schedule from the owner terminal 210 (S120). In the notification indicating change of a movement schedule, for example, a date, a time, and whether the vehicle is scheduled to move after the change in the time as a change target are designated. When a date and a time (an occupied time due to movement of the vehicle or an inaccessible time except an occupant) in which a vehicle moves decreases in the notification indicating change of a movement schedule, the rental management server 410 can simply change the movement schedule and end the process flow. Accordingly, only the notification indicating change of a movement schedule when the date and the time at which the vehicle moves are changed or when the time increases is processed thereafter. Accordingly, S120 is an example of a process of causing the rental management server 410 to receive a request for change of the movement schedule of the vehicle of the owner from a non-movement schedule to a movement schedule at a date and time overlapping the date and time at which rental of the vehicle is reserved from the terminal of the owner of the vehicle.

Then, the rental management server 410 determines whether a vehicle interior rental schedule is set at the date and the time as a change target (S121). When the vehicle interior rental schedule is not set at the date and the time as a change target (NO in S121), the rental management server 410 changes the movement schedule information (S122) and ends the process flow.

On the other hand, when the vehicle interior rental schedule is set at the date and the time as a change target (YES in S121), the rental management server 410 searches for alternative vehicles from the cluster member table (FIG. 6) (S123). Then, the rental management server 410 searches for an available alternative vehicle at the date and the time as a change target from the searched-for alternative vehicles. Then, when there is an available alternative vehicle at the date and the time as a change target (YES in S124), the rental management server 410 changes the vehicle interior rental schedule (S125). That is, rental of the interior of the alternative vehicle is reserved at the date and the time as a change target. The reservation for rental of the interior of the vehicle which has been originally reserved at the date and the time as a change target is cancelled. Accordingly, the processes of S123 to S125 is an example of a process of causing the rental management server 410 to determine one vehicle from vehicles belonging to the same group as the vehicle which is a transportation destination as an alternative vehicle.

The rental management server 410 acquires terminal authentication information used for authentication in the key unit 100 of the alternative vehicle from the central server 400. Then, the rental management server 410 transmits the information for identifying the alternative vehicle and the terminal authentication information used for authentication in the key unit 100 to the deliverer terminal 220 and the receiver terminal 230 (S126). Similarly to FIGS. 16A and 16B, the rental management server 410 may transmit the terminal authentication information to the deliverer terminal 220 when a request for unlocking information is issued at the time of delivery. Similarly to FIGS. 16A and 16B, the rental management server 410 may transmit the terminal authentication information to the receiver terminal 230 when the delivery has been completed. The process of S126 is an example of a process of causing the rental management server 410 to control transmission of the information for identifying the selected alternative vehicle and access permission information for permitting an access to the interior of the alternative vehicle to a terminal of a service user.

Then, the rental management server 410 counts up a monthly frequency of vehicle interior rental change due to change of a schedule in the owner evaluation table and reduces the incentive points of the owner of the corresponding vehicle (S127). The method of reducing the incentive points is not particularly limited. For example, a fixed value may be subtracted therefrom or points corresponding to a predetermined proportion may be decreased. The monthly frequency of vehicle interior rental change due to change of a schedule is an example of a rate at which rental of a reserved vehicle could not be implemented due to change of a movement schedule. Accordingly, through the process of S127, the rental management server 410 can be said to determine the incentive points which are offered to an owner of a reserved vehicle based on a rate at which rental of the reserved vehicle could not be implemented due to change of a movement schedule.

On the other hand, when there is no available alternative vehicle at the date and the time as a change target (NO in S124), the rental management server 410 returns a response indicating that the movement schedule is not to be changed to the owner terminal 210 (S128). When the movement schedule is not to be changed, the owner of the vehicle performs the procedure based on conventions of the carsharing service provided by the information system. For example, an owner of a vehicle contacts a manager of the carsharing service or the like and consults about a preferable measure.

Advantages of Second Embodiment

As described above, in the information system according to the second embodiment, the rental management server 410 receives a notification indicating that a capacity of baggage to be delivered by a deliverer is greater than the capacity of the interior of a vehicle as a delivery destination, selects an alternative vehicle belonging to the same cluster as the vehicle which is the delivery destination, and notifies the deliverer terminal 220. A cluster is formed by vehicles of which a parking lot is located near a parking lot address of each vehicle. Accordingly, by causing the rental management server 410 to select a vehicle belonging to the same cluster as the vehicle which is a delivery destination, there is a high likelihood that a second-best method will be performed even when a situation in which the capacity of baggage to be delivered is greater than the capacity of the interior of the vehicle which is a delivery destination. That is, the rental management server 410 can select an alternative vehicle from vehicles near the delivery destination as much as possible and can set the selected alternative vehicle as a new delivery destination. As a result, the information system according to the second embodiment can reduce the frequency in which a deliverer returns with a delivery object due to an over-capacity and can enable a receiver to receive the delivery object near the original delivery destination. For example, by searching for an alternative vehicle from the vehicles belonging to the same cluster in the order of getting apart from the vehicle as the original delivery destination, the information system can improve convenience for a deliverer and a receiver.

In the second embodiment, when an activity schedule of an owner is changed and the owner newly wants to drive the vehicle, the owner of the vehicle can drive the vehicle even when the interior of the vehicle has been reserved at the date and the time at which driving of the vehicle is necessary. That is, the owner can receive a service of searching for an alternative vehicle using the rental management server 410 by setting change of the movement schedule in the rental management server 410. When an alternative vehicle is searched for, the rental management server 410 can change the vehicle interior rental schedule such that the interior of the alternative vehicle is provided instead of the original vehicle. Accordingly, with the information system, it is possible to increase a likelihood that an owner of a vehicle will be able to use the vehicle even when the owner of the vehicle has approved rental of the interior of the vehicle in the carsharing service and the interior of the vehicle has been already reserved by another user. The information system can flexibly cope with a case in which urgent business occurs in an owner of a vehicle and the owner wants to use the vehicle. Such a service of searching for an alternative vehicle is advantageous when baggage has been already delivered (but not picked up) to the interior of a vehicle which is used as a home delivery box (or a pickup box). When it is necessary to drive the vehicle in a state in which another user's baggage has been delivered and has not been received by a receiver, the owner can requests the rental management server 410, which performs the process of S120 in FIG. 18, to change the movement schedule. The owner of the vehicle can get previous permission of a scheduled receiver of the baggage and transfer the baggage delivered to the vehicle to an alternative vehicle which is provided by the rental management server 410. Accordingly, for example, even when urgent business occurs in the owner of the vehicle, it is possible to decrease a likelihood that a scheduled receiver of baggage will not be able to receive the baggage in the interior of the vehicle.

When the interior of a vehicle has been already reserved by another user and the interior of an alternative vehicle is provided instead of the interior of the vehicle due to change of a movement schedule of the vehicle, an activity schedule of the owner of the vehicle, or the like, the incentive points of the owner are decreased. Accordingly, in the carsharing service provided by the information system, an owner of a vehicle takes consideration such that rental of the interior of the vehicle in the carsharing service is not affected by schedule change of the owner as much as possible and thus it is possible to provide a stable carsharing service. In the information system, by preferentially selecting a vehicle of an owner having agreed to provision of a movement schedule or a vehicle of an owner having a high number of incentive points as a delivery destination, it is possible to select a vehicle with high certainty as a delivery box for home delivery.

Third Embodiment

In the first and second embodiment, an example of a process flow in the information system using the interior of a vehicle as a home delivery box of a delivery destination of home delivery has been described. In the second embodiment, a process of requesting switching from a vehicle in the same cluster to an alternative vehicle when the interior of a vehicle has an over-capacity at the time of delivery or when an owner of a vehicle wants to use the vehicle of which the interior has been already reserved for driving has been described.

In the third embodiment, an example of a process flow of designating a cluster into which vehicles are grouped and formed as a delivery destination of home delivery or a delivery destination of a purchased product in online shopping or the like will be described. When a delivery destination can be designated as a cluster, the delivery destination can be selected from a plurality of vehicles located in a certain limited range at the date and time at which actual delivery is performed and control can be performed such that the delivery is completed even if the date and time of delivery is not clearly fixed. Accordingly, it is possible to flexibly deliver a delivery object with convenience for a home delivery company and a receiver.

Figure 19A:
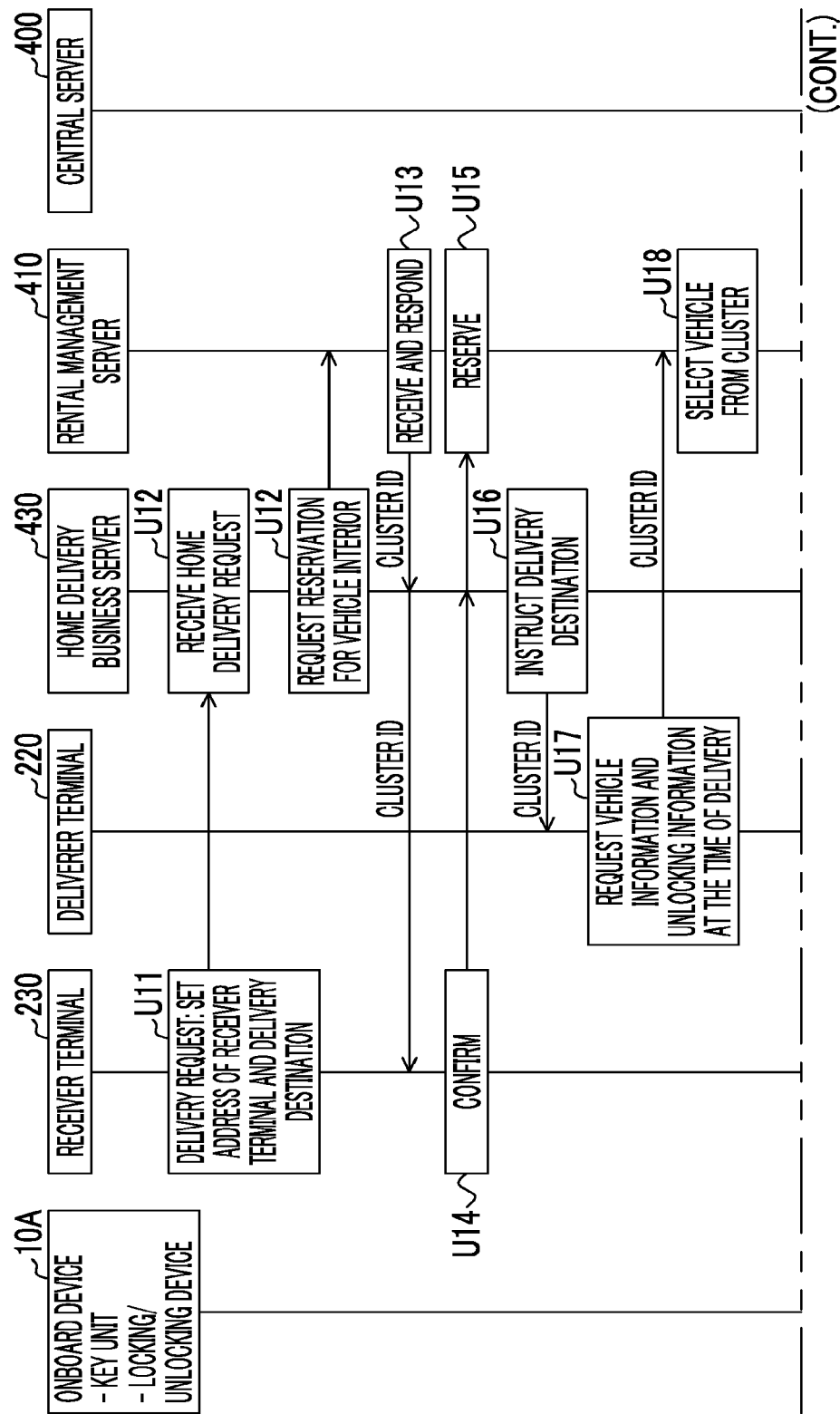
FIG. 19A is sequence diagram of an information system according to a third embodiment.

FIGS. 19A and 19B are sequence charts of the information system according to the third embodiment. FIGS. 19A and 19B illustrate transmission and reception of information between a onboard device 10A mounted in a vehicle 10, a receiver terminal 230 of a receiver who receives a home delivery object, a deliverer terminal 220 of a home delivery company, a home delivery business server 430, a rental management server 410, and a central server 400. In FIGS. 19A and 19B, the rental management server 410 and the home delivery business server 430 are separated from each other in comparison with FIGS. 16A and 16B according to the second embodiment. However, in the third embodiment, the process of the home delivery business server 430 may be incorporated into the rental management server 410 and both may operate as a unified body. The configuration and operation in the third embodiment except that a delivery destination can be designated as a cluster and the rental management server 410 and the home delivery business server 430 are separated are the same as in the first and second embodiments. Therefore, the same elements in the third embodiment as in the first and second embodiments will be referred to by the same reference signs and description thereof will not be repeated. In FIGS. 19A and 19B, the home delivery business server 430 is illustrated, but the processes in the third embodiment are not limited to the processes associated with the home delivery business server 430 and the configuration of the third embodiment can be applied to a business server for an online shopping service and other business servers.

In the process flow of the information system, for example, in an online shopping service, the receiver terminal 230 transmits a delivery request including a communication address of the receiver terminal 230 on the network N1 and a delivery destination of a purchased product to the home delivery business server 430. In another example, the receiver terminal 230 sets a delivery destination address and a confirmation result of a scheduled (desired) delivery date and time or the like in the rental management server 410 from the communication address of the receiver terminal 230 on the network N1, for example, in response to a confirmation request notification of the delivery date and time from the home delivery business server 430 (U11). Here, a receiver may not fix the scheduled delivery date and time or the desired delivery date and time. An example of such a case is a case in which a schedule for securing an ordered product cannot be clearly fixed due to circumstances of an online shopping company. Another example thereof is a case in which a schedule for receiving a delivery object cannot be clearly fixed by a receiver.

When the scheduled delivery date and time or the desired delivery date and time cannot be fixed, the rental management server 410 does not specify the scheduled delivery date and time, designates a surrounding area of the delivery destination address of the purchased product in the online shopping, and requests a reservation for the interior of a vehicle to the rental management server 410 (U12). The reservation request for the interior of a vehicle in U12 is an example of a service usage request using a vehicle as a delivery destination of baggage. The rental management server 410 receives the reservation request for the interior of a vehicle. Unlike the second embodiment, when the scheduled delivery date and time is not clearly fixed, the rental management server 410 returns and presents a response including a cluster ID and an address of an available cluster around the delivery destination address and other information to the receiver terminal 230 via the home delivery business server 430 with reference to the cluster definition table (U13). The process of U13 of causing the rental management server to receive the reservation request for the interior of a vehicle is an example of receiving a service usage request including a desired rental region of the interior of a vehicle which is supplied for the vehicle rental service. The process of causing the rental management server 410 to return a response in U13 is an example of specifying a group of vehicles associated with the desired rental region and providing information on the specified group.

When a receiver performs acknowledgement via a GUI of the receiver terminal 230 (U14), the reservation for the cluster is registered in the rental management server 410 via the home delivery business server 430 (U15). The rental management server 410 may promote the receiver to set an approximate reservation period via the receiver terminal 230 and control the reservation such that the reservation is not concentrated on a specific cluster in a specific period. When the reserved cluster is confirmed by the receiver terminal 230, the reservation for the cluster is registered in the rental management server 410, and the scheduled delivery date and time is fixed, the home delivery business server 430 notifies the deliverer terminal 220 of the information indicating the delivery destination (U16).

When the scheduled delivery date and time is within a predetermined time (for example, within one day), the deliverer terminal 220 designates a cluster ID as a delivery destination and requests the rental management server 410 to transmit vehicle information for identifying a vehicle as an actual delivery destination belonging the cluster and terminal authentication information for unlocking a gate or door to the interior of the vehicle via the home delivery business server 430 (U17). The request in U17 is an example of an access request to the group which is issued from a terminal of a service user in charge of transportation of baggage within a predetermined period from the scheduled transportation date and time after the scheduled transportation date and time at which transportation of baggage is performed has been fixed. When vehicle information and terminal authentication information are requested from the deliverer terminal 220, the rental management server 410 first selects one vehicle which is not reserved at the scheduled delivery date and time in the rental schedule DB D15 (see FIG. 11) from vehicles belonging to the designated cluster ID (U18). When there is a plurality of vehicles which are not reserved at the scheduled delivery date and time, the rental management server 410 selects a vehicle as follows. The process of U18 is an example of selecting one vehicle from the vehicles belonging to the group.

The method of selecting a vehicle belonging to a cluster ID is the same as in the first and second embodiments (for example, the process of S8 performed by the rental managing unit F15 in FIG. 12). The rental management server 410 may set the order of getting apart from the address designated by a vehicle interior rental application as a recommended order. The rental managing unit F15 may set a recommended order in which a vehicle of an owner having agreed to provision of a movement schedule. The rental managing unit F15 may sort vehicles in the order of decreasing the incentive points from an owner having a highest number of incentive points in the owner evaluation table (see FIG. 8) and set the sorted order as a recommended order. These conditions may be weighted and combined and the weighted order may be set as the recommended order. Then, the rental management server 410 selects one most preferable vehicle in the recommended order as a delivery destination from the vehicles belonging to the cluster.

The rental management server 410 designates a vehicle ID of a vehicle selected as the delivery destination, an owner ID of the vehicle, and a password and requests the central server 400 to transmit terminal authentication information (U19). Here, the terminal authentication information is information which is used for authentication in the key unit 100 to correspond to device authentication information of the key unit 100, similarly to the first embodiment.

Then, the central server 400 issues the terminal authentication information which is used for authentication in the key unit 100 registered in correlation with the designated owner ID and the designated vehicle ID (U20). Then, the rental management server 410 receives the terminal authentication information from the central server 400 transmits information (vehicle information) for identifying the vehicle selected as the delivery destination and the received terminal authentication information to the deliverer terminal 220 via the home delivery business server 430 or directly (U21). The processes of U19 to U21 are an example of selecting one vehicle from the vehicles belonging to the group and controlling transmission of information for identifying the selected vehicle and access permission information for permitting an access to the interior of the selected vehicle to the service user terminal.

The deliverer terminal 220 receives the vehicle information for identifying the vehicle serving as a home delivery box of the delivery destination and the terminal authentication information which is a one-time key from the rental management server 410 via the home delivery business server 430 or directly (U22). Then, the deliverer moves to the parking lot address or the parking lot position of the vehicle designated as the delivery destination using a car navigation function or the like and specifies the vehicle from the registration number, the vehicle manufacturer, the popular name of the vehicle (a vehicle model), and the color which identify the vehicle. The deliverer terminal 220 requests the key unit 100 mounted in the vehicle 10 designated as the delivery destination for authentication using the received terminal authentication information and performs an unlocking operation in response to the deliverer's operation (U23). Then, the key unit 100 of the onboard device 10A performs the requested authentication and unlocks the gate or door to the interior of the vehicle 10 in accordance with an unlocking request when the authentication has succeeded (U24).

When the gate or door to the interior of the vehicle 10 is unlocked, the deliverer opens the gate or door to the interior of the vehicle. After the gate or door to the interior of the vehicle has been opened, the deliverer completes the delivery when a delivery object can be accommodated in the interior of the vehicle. The deliverer terminal 220 notifies the home delivery business server 430 of a delivery completion notification in response to the deliverer's operation (U25). However, when the volume or size of the delivery object is greater than the allowable capacity of the interior of the vehicle (YES in U24), a next vehicle is necessary. Therefore, when the capacity of the interior of the vehicle is insufficient and a next vehicle is necessary, the deliverer terminal 220 designates the original cluster ID and requests the rental management server 410 for a next vehicle via the home delivery business server 430 or directly in response to the deliverer's operation (U25). Then, the rental management server 410 searches for another vehicle from the same cluster (U26). When a next vehicle is searched for, the rental management server 410 returns the process flow to U19 and requests transmission of terminal authentication information used for authentication of the next vehicle.

Although not illustrated in FIGS. 19A and 19B, the process when a next vehicle is not searched for in the process of U21 is the same as the process of searching for an alternative vehicle in FIGS. 16A and 16B. The reason why an alternative vehicle is searched for in FIGS. 16A and 16B and a next vehicle is searched for in FIGS. 19A and 19B is that when the capacity of the interior of a vehicle as a delivery destination is insufficient in FIGS. 19A and 19B, the deliverer may distribute and accommodate a delivery object in a plurality of vehicles belonging to the cluster. In this case, the deliverer terminal 220 or the home delivery business server 430 can notify the receiver terminal 230 of information for identifying the vehicles in which the delivery object is distributed and accommodated. In the second embodiment, when the interior of a vehicle is in an over-capacity, the deliverer may distribute and accommodate the delivery object in a plurality of vehicles belonging to the cluster instead of substituting the delivery destination with an alternative vehicle.

When the deliverer terminal 220 notifies the rental management server 410 of the delivery completion notification in U25 (U27), the deliverer terminal 220 invalidates the terminal authentication information, for example, by deleting the terminal authentication information stored in the deliverer terminal 220 (U28). The processes after the delivery has been completed are the same as the processes of T24 and subsequent thereto in FIGS. 16A and 16B and thus description thereof will not be repeated.

As described above, with the information system according to the third embodiment, vehicles can be grouped into clusters and an online shopping user or a receiver of home delivery can designate a cluster as a delivery destination. The cluster can be said to be a group of vehicles which is formed based on at least one of locations of parking lots at which vehicles are parked, movement ranges of the vehicles, activity ranges of owners of the vehicles, and friendship ranges of the owners. Accordingly, in a carsharing service in which the interior of a vehicle is rented, a user can flexibly use the carsharing service by designating a cluster as a rental destination. For example, it is possible to increase a likelihood that a deliverer will complete delivery to one or more other vehicles near the delivery destination and to decrease a likelihood of redelivery even when the interior of a specific vehicle is accidentally in an over-capacity state. It is also possible to increase a likelihood that a receiver will receive a delivery object in a vehicle near the original delivery destination early. Even when a scheduled delivery date and time is not fixed, an online shopping user can enjoy the online shopping easily without being conscious of the scheduled delivery date and time by first designating a cluster as a latent delivery destination. In actual delivery, it is possible to appropriately select a vehicle in a cluster in the order preferable for the deliverer and the receiver such as the order of getting apart from the delivery destination address at which the receiver lives or the order of decreasing the incentive points due to provision of a movement schedule or observation of the movement schedule in cooperation of the deliverer terminal 220 with the home delivery business server 430, the rental management server 410, and the central server 400, and to improve convenience for the deliverer and the receiver.

Modified Example 1 of Embodiment

In the above-mentioned embodiments, an example in which a vehicle 10 is unlocked by the locking/unlocking device 300 when the authentication process in the key unit 100 has succeeded has been described above, but the process in the key unit 100 may be performed by the locking/unlocking device 300 in Modified Example 1 of the embodiments. That is, the locking/unlocking device 300 may include a control unit (ECU) that authenticates authentication information received from the user terminal 200, and the control unit may transmit an unlocking command or a locking command to the body ECU 304 via an onboard network such as a CAN when the authentication of the user terminal 200 has succeeded. With the carsharing system according to Modified Example 1, baggage can be received by a receiver as a third party with a simple configuration without installing the key unit 100.

Modified Example 2 of Embodiment

In the above-mentioned embodiments, a user terminal 200 receives authentication information from the central server 400, a locking/unlocking signal is transmitted from the key unit 100 to the locking/unlocking device 300 when the user terminal 200 is authenticated based on the received authentication information, and a vehicle 10 is locked and unlocked. In Modified Example 2 of the embodiments, the authentication information is not information for authenticating the user terminal 200 but includes information of a key ID for locking and unlocking the vehicle 10.

In this case, the user terminal 200 receives authentication information including a key ID for locking and unlocking the vehicle 10 from the central server 400, and transmits the received key ID to the locking/unlocking device 300 along with a locking/unlocking signal. The locking/unlocking device 300 compares the received key ID with a key ID stored in advance in the locking/unlocking device 300 and locks and unlocks the vehicle 10 when both key IDs coincide with each other. The key ID may be encrypted and transmitted between the user terminal 200 and the central server 400 or the locking/unlocking device 300. The central server 400 may generate a one-time key, for example, by encrypting the key ID along with time information using a predetermined algorithm. The locking/unlocking device 300 can decrypt the received one-time key using the same algorithm as in the central server 400 and compare the decrypted one-time key with the key ID stored in advance in the locking/unlocking device 300. The one-time key may be transmitted from the central server 400 to the rental management server 410 and transmitted from the rental management server 410 to the user terminal 200. In any case, the user terminal 200 can invalidate the one-time key by deleting the one-time key when a predetermined time has elapsed from reception of the one-time key.

Since the one-time key generated from the key ID and the time information is included in the authentication information, the central server 400 can generate authentication information which is temporarily valid for each received request and transmit the generated authentication information to the user terminal 200.

Modified Example 3 of Embodiment

In Modified Example 2 of the embodiments, the central server 400 transmits authentication information for the user terminal 200 corresponding to fixed authentication information specific to the key unit 100 or a key ID stored in advance in the locking/unlocking device 300 of the vehicle 10 to the user terminal 200. However, the authentication information between the user terminal 200 and the key unit 100 is not limited thereto. In Modified Example 3 of the embodiments, for example, when a request for terminal authentication information is received from the user terminal 200, the central server 400 may generate new terminal authentication information and issue the new terminal authentication information to the user terminal 200. In this case, the central server 400 can store device authentication information for the key unit 100 corresponding to the new terminal authentication information for the user terminal 200 to the key unit 100 via an onboard communication device (not illustrated) communicating with the network N1 connected to the central server 400. In this case, the key unit 100 can be connected to the onboard communication device via the CAN or the like. Here, the central server 400 may generate new terminal authentication information based on identification information for identifying a vehicle 10 and time information and transmit the new terminal authentication information and the time information to the user terminal 200. In this case, the key unit 100 can also generate new device authentication information using the same algorithm as in the central server 400. The user terminal 200 can transmit the new authentication information and the time information to the key unit 100 and be authenticated.

OTHERS

In the carsharing system 1 according to the embodiments and the modified examples, regarding locking/unlocking of the vehicle 10, it is assumed that unlocking/locking of only a cargo compartment door (gate) is controlled, unlocking/locking of a passenger compartment is not controlled but the passenger compartment is maintained in a locked state in consideration of security. In a vehicle 10 having a body structure in which a cargo compartment and a passenger compartment are not partitioned from each other, for example, a vehicle 10 of a one-box type, the passenger compartment can be accessed by unlocking the cargo compartment door and thus an owner of a vehicle or the like may have concern in security.

Therefore, in a vehicle 10 in which a cargo compartment and a passenger compartment are not partitioned from each other, a moving image of the passenger compartment is captured by a drive recorder or the like that can image the passenger compartment when the cargo compartment door is opened, and it can be determined whether there is invasion from the cargo compartment to the passenger compartment based on the captured moving image. For example, when it is determined that there is invasion from the cargo compartment into the passenger compartment, an ECU that controls the drive recorder performs storage of the captured image, operation of an onboard alarm, notification of a provider, notification of a user, and the like. On the other hand, when it is determined that there is no invasion into the passenger compartment, the ECU may delete the captured moving image at a time point at which the cargo compartment door is closed and a locking operation is performed. The drive recorder may transmit the captured moving image to the owner terminal 210 regardless of whether there is invasion into the passenger compartment as part of a user service.

In the first to third embodiments, the processes which are performed by the information system for supporting implementation of a vehicle interior rental service have been described. However, the processes which are performed by the information system in the first to third embodiments are not limited to the vehicle interior rental service. For example, the processes which are performed by the information system in the first to third embodiments can also be applied to a rental service with movement of a vehicle.

What is claimed is:
1. A carsharing system comprising:
circuitry configured to:
receive, from a user, a usage request for requesting a reservation for use of a vehicle of a plurality of vehicles which are supplied for a vehicle rental service;
permit the reservation for use of the vehicle when the circuitry receives the usage request and no reservation for use of the vehicle has been made at time of receiving the usage request; and
give, when the reservation for use of the vehicle is determined, a permission for locking or unlocking by using electronic information to the user at a date and a time on which the vehicle is used, wherein the vehicles which are supplied for the vehicle rental service are grouped based on geographical position relationships correlated with the vehicles respectively, and the circuitry is configured to:
determine one vehicle of the vehicles as an alternative vehicle, the one vehicle belonging to a same group as a vehicle which is a transportation destination when a notification is received from a terminal of a service user associated with transportation of baggage, the notification indicating that an over-capacity has occurred, the over-capacity being a situation in which the baggage to be transported is not able to be accommodated in the interior of the vehicle which is the transportation destination; and
control transmitting, to the terminal of the service user, information for identifying the alternative vehicle and access permission information for permitting an access to an interior of the alternative vehicle.

2. The carsharing system according to claim 1, wherein the usage request includes a desired rental schedule which is a schedule in which the user desires rental of the vehicle, and the circuitry is configured to:
store reservation schedule information indicating a status of the reservation for use of the vehicle;
acquire movement schedule information indicating a movement schedule of the vehicle; and
provide information on a vehicle of which both the reservation schedule information and the movement schedule information satisfy the desired rental schedule.

3. The carsharing system according to claim 2, wherein the desired rental schedule includes a scheduled transportation date and time, the transportation of the baggage being planned to be performed at the scheduled transportation date and time, and the circuitry is configured to:
select a selected vehicle which is available at the scheduled transportation date and time; and
set a reservation for use of the selected vehicle at the scheduled transportation date and time in the reservation schedule information.

4. The carsharing system according to claim 3, wherein the circuitry is configured to control transmitting, to the terminal of the service user associated with the transportation of the baggage, information for identifying the selected vehicle and access permission information for permitting an access to interior of the selected vehicle.

5. The carsharing system according to claim 4, wherein the usage request includes receiver terminal information for specifying an address of a terminal of a receiver who receives the baggage, and the circuitry is configured to control transmitting, to the terminal of the receiver, the information for identifying the selected vehicle and the access permission information for permitting an access to the interior of the selected vehicle.

6. The carsharing system according to claim 4, wherein the circuitry is configured to:
receive, from a terminal of an owner of the vehicle, a change request for changing a movement schedule of the vehicle related to a period overlapping with a rental schedule, from a first plan to a second plan, the rental schedule being a schedule in which rental of the vehicle is reserved, the first plan being a plan that the vehicle is not to move, and the second plan being a plan that the vehicle is to move; and
determine the one vehicle of the vehicles as the alternative vehicle when the change request is received.

7. The carsharing system according to claim 2, wherein the movement schedule information is generated based on activity schedule information in which an activity schedule of an owner of the vehicle is set.

8. The carsharing system according to claim 2, wherein the circuitry is configured to offer a predetermined incentive to an owner of the vehicle who has permitted provision of the movement schedule information or an owner who has agreed to acceptance of a movement limitation of a vehicle.

9. The carsharing system according to claim 8, wherein the circuitry is configured to determine incentive points offered to an owner of a reserved vehicle based on a first ratio or a second ratio, the reserved vehicle being a vehicle of which rental is reserved based on the reservation schedule information, the first ratio being a ratio of a number that rental of the vehicle in accordance with the reservation schedule information is performed to a reserved number, the second ratio being a ratio of a number that the rental of the vehicle in accordance with the reservation schedule information is not performed to the reserved number, and the reserved number being a number that rental of the vehicle is reserved based on the reservation schedule information.

10. The carsharing system according to claim 2, wherein the circuitry is configured to provide information on vehicles in a recommended order in which a first vehicle or a second vehicle has priority when a plurality of vehicles satisfies the desired rental schedule, the first vehicle being a vehicle of an owner who has permitted provision of the movement schedule information, and the second vehicle being a vehicle of an owner who has high incentive points.

11. The carsharing system according to claim 1, wherein
the usage request includes information for specifying geographical conditions in which the vehicle rental service is provided, and
the circuitry is configured to provide information on vehicles which satisfy the geographical conditions with reference to position information of the vehicles which are supplied for the vehicle rental service.

12. The carsharing system according to claim 1, wherein the usage request includes a desired rental region in which the user desires rental of the vehicle,
the circuitry is configured to:
store groups of the plurality of vehicles, each of which is formed based on geographical position relationships correlated with other vehicles of a respective group;
specify a group of the groups associated with the desired rental region based on the usage request; and
provide information on the group associated with the desired rental region.

13. The carsharing system according to claim 12, wherein the usage request requests a reservation for use of the vehicle as a transportation destination of the baggage, and the circuitry is configured to:
select, as a selected vehicle, one vehicle of the vehicles belonging to the group in response to a request for an access to the group which is issued from the terminal of the service user within a predetermined period from a scheduled transportation date and time at which the transportation of the baggage is performed after a scheduled transportation date and time has been determined; and control transmitting information for identifying the selected vehicle and access permission information for permitting an access to interior of the selected vehicle to the terminal of the service user.

14. A carsharing method comprising:

causing circuitry to receive, from a user, a usage request requesting a reservation for use of a vehicle which is supplied for a vehicle rental service;

causing the circuitry to permit the reservation for use of the vehicle when the circuitry receives the usage request and no reservation for use of the vehicle has been made at time of receiving the usage request; and causing the circuitry to give, when the reservation for use of the vehicle is determined, a permission for locking or unlocking by using electronic information to the user at a date and time on which the vehicle is used, wherein the vehicles which are supplied for the vehicle rental service are grouped based on geographical position relationships correlated with the vehicles respectively, and the method further comprises:

causing the circuitry to determine one vehicle of the vehicles as an alternative vehicle, the one vehicle belonging to a same group as a vehicle which is a transportation destination when a notification is received from a terminal of a service user associated with transportation of baggage, the notification indicating that an over-capacity has occurred, the over-capacity being a situation in which the baggage to be transported is not able to be accommodated in an interior of the vehicle which is the transportation destination; and causing the circuitry to control transmitting, to the terminal of the service user, information for identifying the alternative vehicle and access permission information for permitting an access to the interior of the alternative vehicle.

15. The carsharing method according to claim 14, further comprising:

causing the circuitry to acquire reservation schedule information indicating a status of the reservation for use of the vehicle;

causing the circuitry to acquire movement schedule information indicating movement schedule of the vehicle; and causing the circuitry to provide information on a vehicle of which both the reservation schedule information and the movement schedule information satisfy a desired rental schedule, the usage request including the desired rental schedule which is a schedule in which the user desires rental of the vehicle.

16. The carsharing method according to claim 15, further comprising:

causing the circuitry to select a selected vehicle which is available at a scheduled transportation date and time, the scheduled transportation date and time being included in the desired rental schedule, and the transportation of the baggage being planned to be performed at the scheduled transportation date and time; and causing the circuitry to set a reservation for use of the selected vehicle at the scheduled transportation date and time in the reservation schedule information.

* * * * *